(12) United States Patent
Lewin et al.

(10) Patent No.: US 12,515,794 B2
(45) Date of Patent: Jan. 6, 2026

(54) UAV HAVING A ROTATABLE CARGO BAY

(71) Applicant: Wing Aviation LLC, Mountain View, CA (US)

(72) Inventors: Jasper Lewin, Santa Cruz, CA (US); Evan Twyford, Mountain View, CA (US)

(73) Assignee: Wing Aviation LLC, Palo Alto, CA (US)

( * ) Notice: Subject to any disclaimer, the term of this patent is extended or adjusted under 35 U.S.C. 154(b) by 640 days.

(21) Appl. No.: 17/979,641

(22) Filed: Nov. 2, 2022

(65) Prior Publication Data

US 2024/0140626 A1  May 2, 2024

(51) Int. Cl.
*B64D 1/12* (2006.01)
*B64D 1/10* (2006.01)
*B64U 30/10* (2023.01)
*B64U 101/64* (2023.01)

(52) U.S. Cl.
CPC ............... *B64D 1/12* (2013.01); *B64D 1/10* (2013.01); *B64U 30/10* (2023.01); *B64U 2101/64* (2023.01)

(58) Field of Classification Search
CPC .............. B64D 1/10; B64D 1/12; B64D 1/22
See application file for complete search history.

(56) References Cited

U.S. PATENT DOCUMENTS

| 9,493,227 | B2 | 11/2016 | Helou, Jr. |
| 10,793,272 | B2 | 10/2020 | Shannon et al. |
| 11,186,368 | B2 | 11/2021 | Prager et al. |
| 11,453,496 | B1 | 9/2022 | Notteboom |
| 2004/0135031 | A1 | 7/2004 | Stupakis |
| 2020/0108921 | A1 | 4/2020 | McCullough |
| 2022/0135217 | A1 | 5/2022 | Wittmaak, Jr. |
| 2022/0212775 | A1 | 7/2022 | Tao |

FOREIGN PATENT DOCUMENTS

| CN | 107985597 | 5/2018 |
| CN | 207617959 U | 7/2018 |
| CN | 217260666 U | 8/2022 |

OTHER PUBLICATIONS

International Search Report and Written Opinion for Int. App. No. PCT/US2023/036359 mailed Sep. 3, 2024.

*Primary Examiner* — Nicholas McFall
(74) *Attorney, Agent, or Firm* — McDonnell Boehnen Hulbert & Berghoff LLP

(57) ABSTRACT

A UAV including a wing attached to a fuselage body, a rotatable cargo bay in the fuselage body, the cargo bay having an entrance for receiving the payload, an actuator in the fuselage body operable to rotate the cargo bay about a pivot axis into a first position where the entrance of the cargo bay is positioned above the fuselage body to allow for entry of the payload into the cargo bay, and the cargo bay extends through an opening in an upper surface of the fuselage body, rotatable into a second position where the entrance of the cargo bay is positioned within the fuselage body during transport; and rotatable into a third position where the entrance of the cargo bay is positioned below the fuselage body to allow for exiting of the payload, and the cargo bay extends through an opening in a lower surface of the fuselage body.

20 Claims, 29 Drawing Sheets

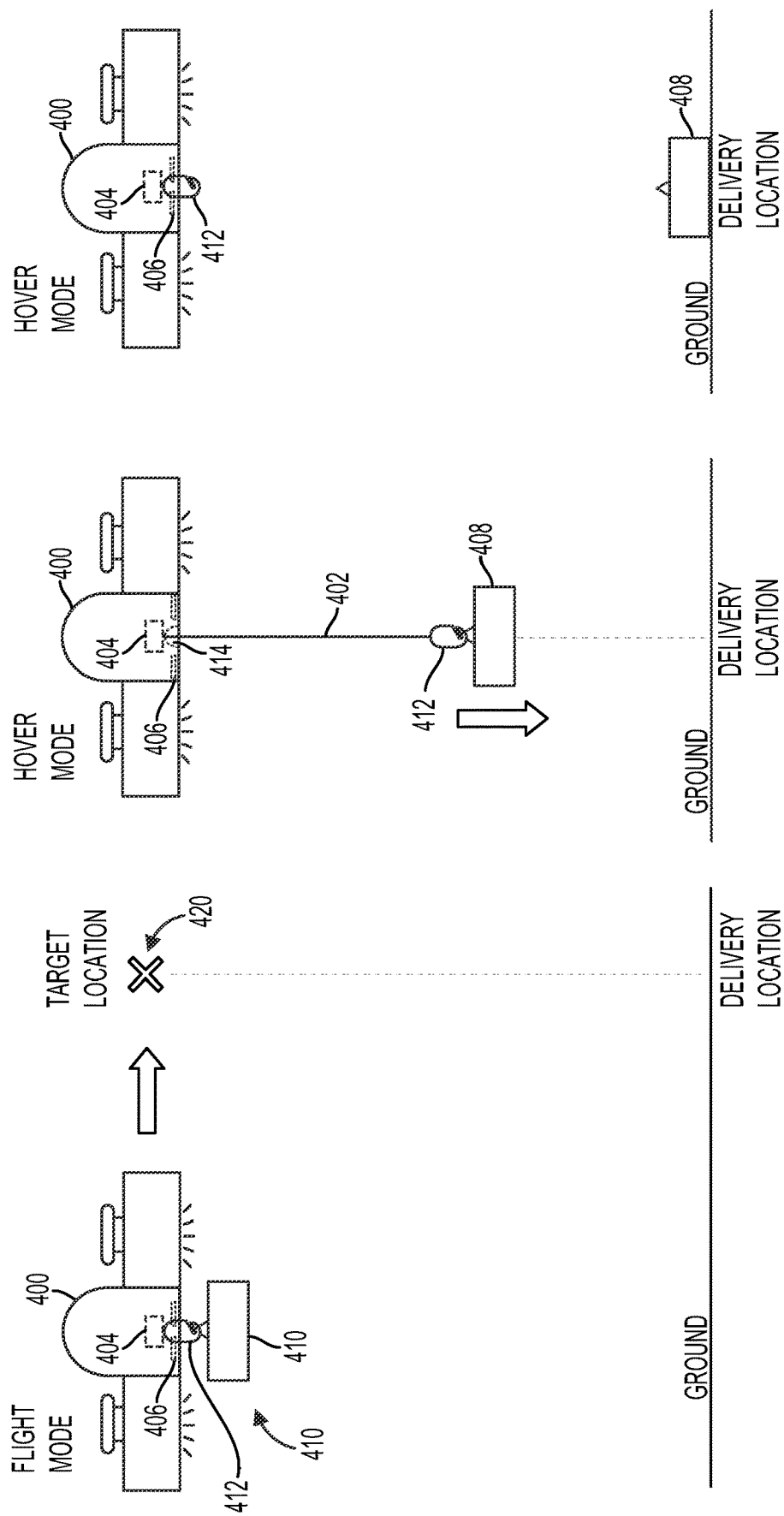

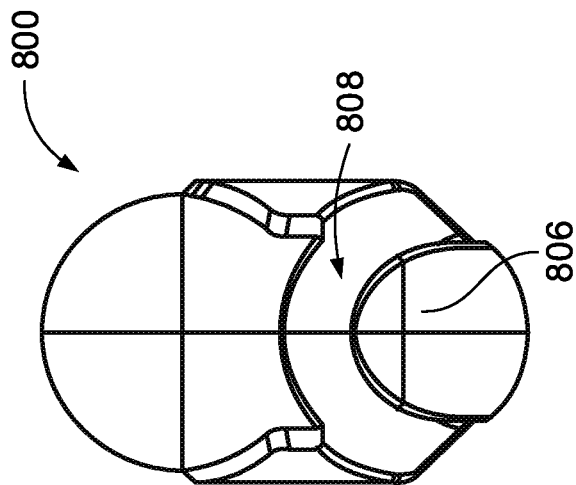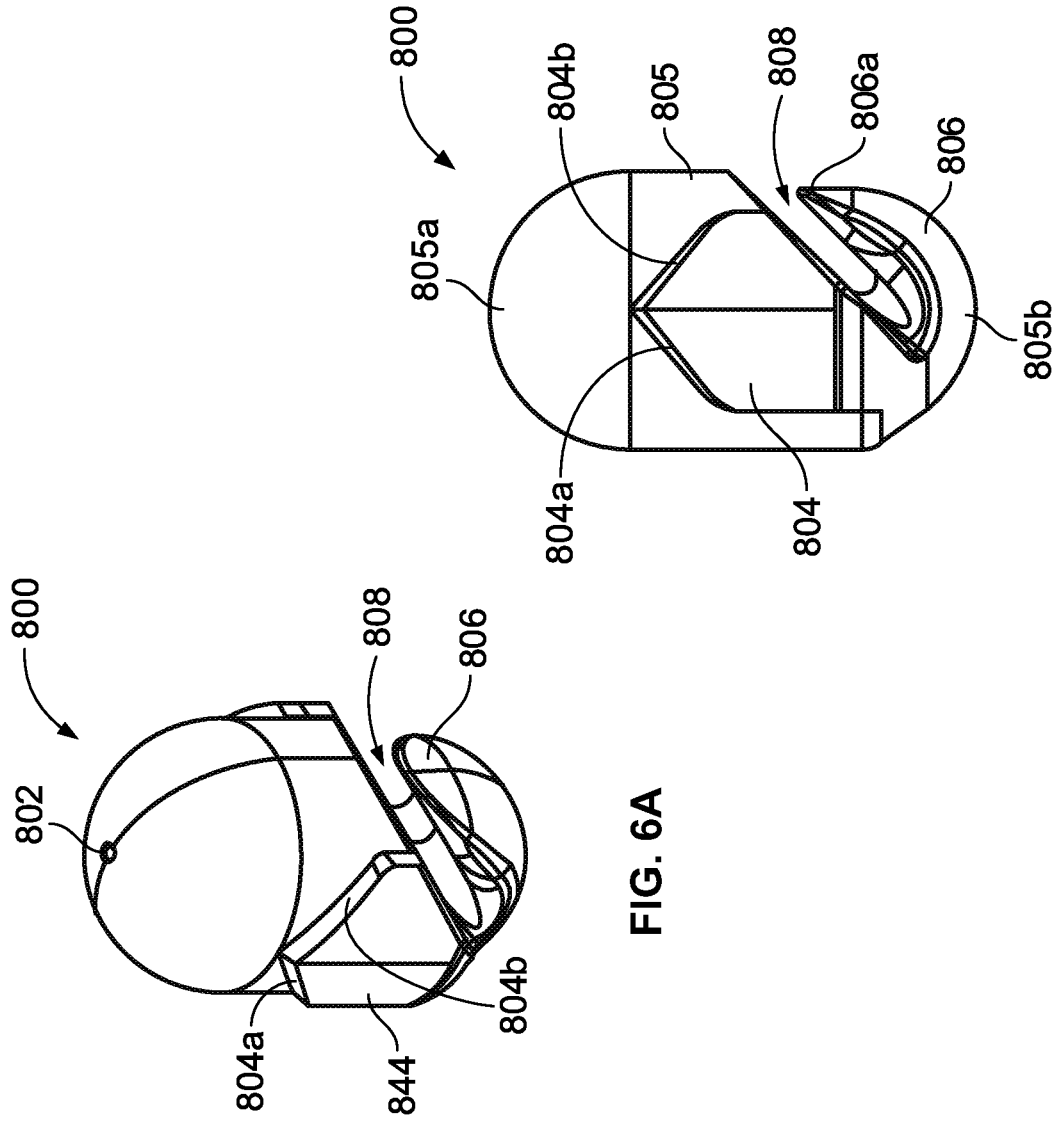
FIG. 6C
FIG. 6B
FIG. 6A

UAV HAVING A ROTATABLE CARGO BAY

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

The present embodiments are directed to an unmanned aerial vehicle (UAV) having a rotatable cargo bay positioned in a fuselage body of the UAV for housing a payload, and an actuator in the fuselage body operable to rotate the cargo bay. The rotatable cargo bay is rotatable into a first position where an entrance of the cargo bay is positioned above the fuselage body to allow for entry of the payload into the rotatable cargo bay, and the rotatable cargo bay extends through an opening in an upper surface of the fuselage body. The rotatable cargo bay is rotatable into a second position where the entrance of the rotatable cargo bay is positioned within the fuselage body during transport of the payload. The rotatable cargo bay is rotatable into a third position where the entrance of the rotatable cargo bay is positioned below the fuselage body to allow for exiting of the payload from the rotatable cargo bay, and the rotatable cargo bay extends through an opening in a lower surface of the fuselage body In one aspect, an unmanned aerial vehicle (UAV) is provided, including a wing attached to a fuselage body; a rotatable cargo bay positioned in the fuselage body for transporting a payload, the rotatable cargo bay having an entrance for receiving the payload; an actuator positioned in the fuselage body operable to rotate the rotatable cargo bay about a pivot axis; wherein the rotatable cargo bay is upwardly rotatable into a first position where the entrance of the rotatable cargo bay is positioned above the fuselage body to allow for entry of the payload into the rotatable cargo bay and where the rotatable cargo bay extends through an opening in an upper surface of the fuselage body; wherein the rotatable cargo bay is rotatable into a second position where the entrance of the rotatable cargo bay is positioned within the fuselage body during transport of the payload; and wherein the rotatable cargo bay is rotatable into a third position where the entrance of the rotatable cargo bay is positioned below the fuselage body to allow for exiting of the payload from the rotatable cargo bay and where the rotatable cargo bay extends through an opening in a lower surface of the fuselage body.

In another aspect, an unmanned aerial vehicle (UAV) is provided, including a fuselage body; a rotatable cargo bay positioned in the fuselage body for transporting a payload, the rotatable cargo bay having an entrance for receiving the payload; an actuator positioned in the fuselage body operable to rotate the rotatable cargo bay about a pivot axis; wherein the rotatable cargo bay is rotatable into a first position where the entrance of the rotatable cargo bay is accessible through a first opening in an upper portion of the fuselage body and provides for the positioning of the payload into the rotatable cargo bay; wherein the rotatable cargo bay is rotatable into a second position where the entrance of the rotatable cargo bay is positioned within, and covered by, at least a portion of the fuselage body during transport of the payload; and wherein the rotatable cargo bay is rotatable into a third position, where the entrance of the rotatable cargo bay is accessible through a second opening in a lower portion of the fuselage body to allow for exiting of the payload from the rotatable cargo bay.

In a further aspect, method is provided including (i) providing an unmanned aerial vehicle (UAV) including a wing attached to a fuselage body, a rotatable cargo bay positioned in the fuselage body for transporting a payload, the rotatable cargo bay having an entrance for receiving the payload, an actuator positioned in the fuselage body operable to rotate the rotatable cargo bay about a pivot axis, wherein the rotatable cargo bay is upwardly rotatable into a first position where the entrance of the cargo bay is positioned above the fuselage body to allow for entry of the payload into the rotatable cargo bay, and the rotatable cargo bay extends through an opening in an upper surface of the fuselage body, wherein the rotatable cargo bay is rotatable into a second position where the entrance of the rotatable cargo bay is positioned within the fuselage body during transport of the payload, and wherein the rotatable cargo bay is moveable into a third position where the entrance of the rotatable cargo bay is positioned below the fuselage body to allow for exiting of the payload from the rotatable cargo bay, and the rotatable cargo bay extends through an opening in a lower surface of the fuselage body; (ii) rotating the rotatable cargo bay into the first position; (iii) receiving the payload in the rotatable cargo bay; (iv) rotating the rotatable cargo bay into the second position for transport; (v) rotating the rotatable cargo bay into the third position, and (vi) dropping the payload from the rotatable cargo bay.

In another aspect, a method is provided including (i) providing an unmanned aerial vehicle (UAV) including a fuselage body; a rotatable cargo bay positioned in the fuselage body for transporting a payload, the rotatable cargo bay having an entrance for receiving the payload; an actuator positioned in the fuselage body operable to rotate the rotatable cargo bay about a pivot axis; wherein the rotatable cargo bay is rotatable into a first position where the entrance of the rotatable cargo bay is accessible through a first opening in an upper portion of the fuselage body and provides for the positioning of the payload into the rotatable cargo bay; wherein the rotatable cargo bay is rotatable into a second position where the entrance of the rotatable cargo bay is positioned within, and covered by, at least a portion of the fuselage body during transport of the payload; and wherein the rotatable cargo bay is rotatable into a third position, where the entrance of the rotatable cargo bay is accessible through a second opening in a lower portion of the fuselage body to allow for exiting of the payload from the rotatable cargo bay; (ii) rotating the rotatable cargo bay into the first position; (iii) receiving the payload in the rotatable cargo bay; (iv) rotating the rotatable cargo bay into the second position for transport; (v) rotating the rotatable cargo bay into the third position, and (vi) dropping the payload from the rotatable cargo bay.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIGS. 4A, 4B, and 4C show a payload delivery apparatus, according to example embodiments.

FIG. 6A is a perspective view of payload coupling apparatus 800, according to an example embodiment.

FIG. 6B is a side view of payload coupling apparatus 800 shown in FIG. 6A.

FIG. 6C is a front view of payload coupling apparatus 800 shown in FIGS. 6A and 6B.

DETAILED DESCRIPTION

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

Figure 1A:
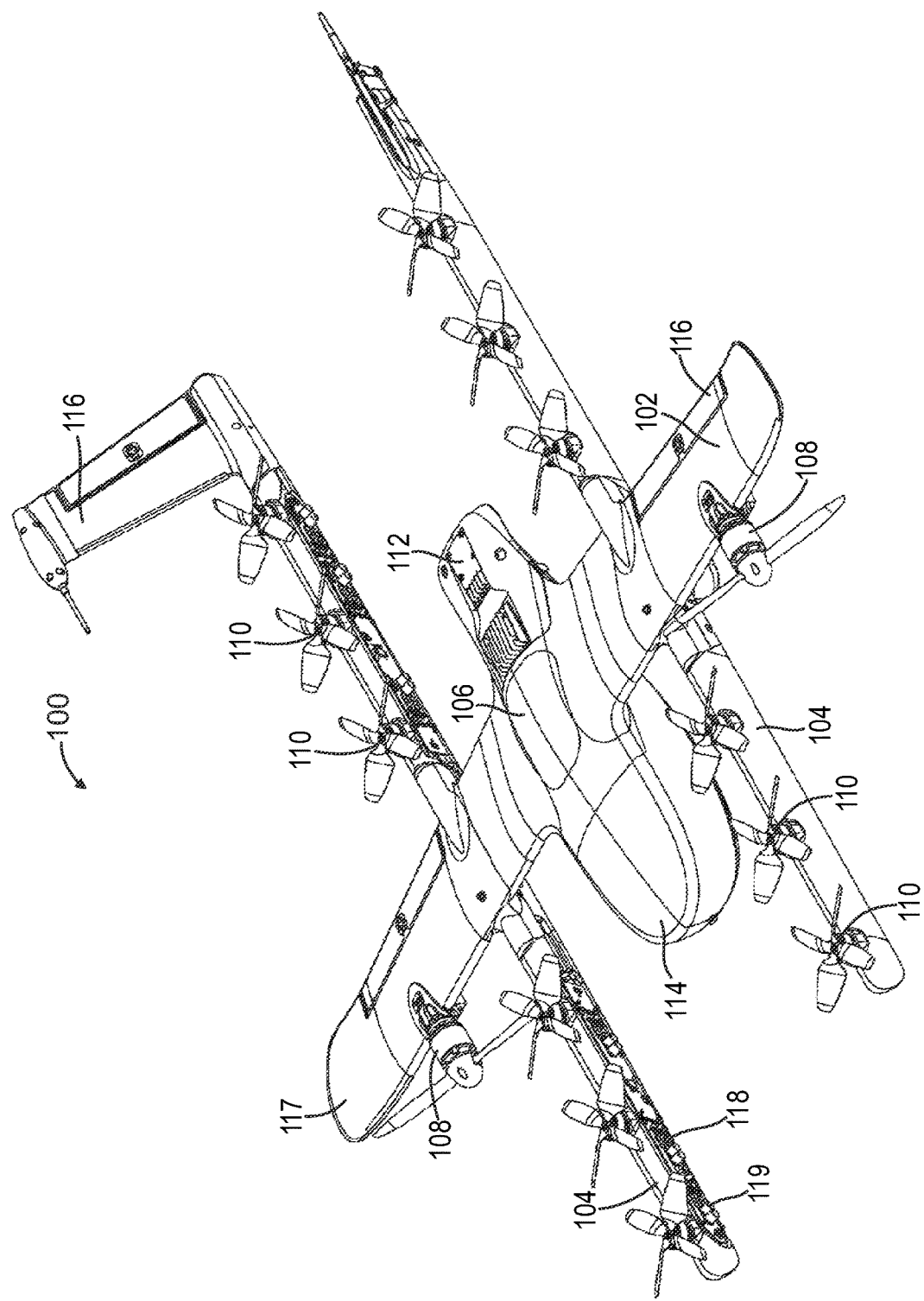
FIG. 1A is an isometric view of an example unmanned aerial vehicle 100, according to an example embodiment.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
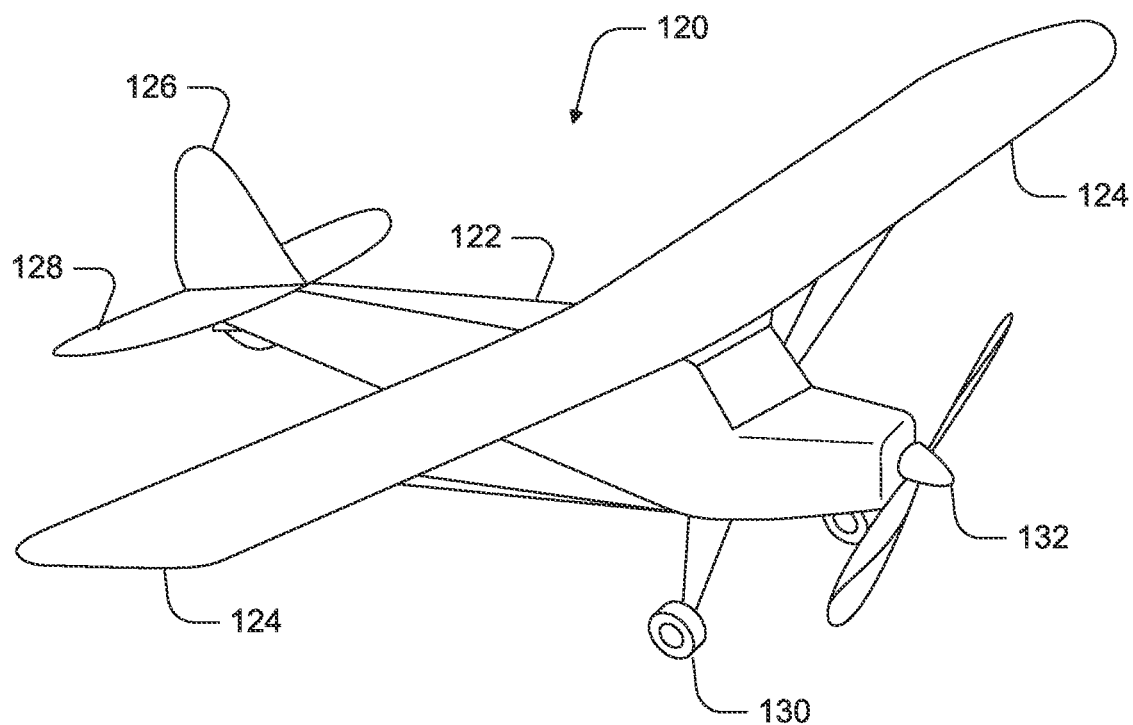
FIG. 1B is a simplified illustration of an unmanned aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
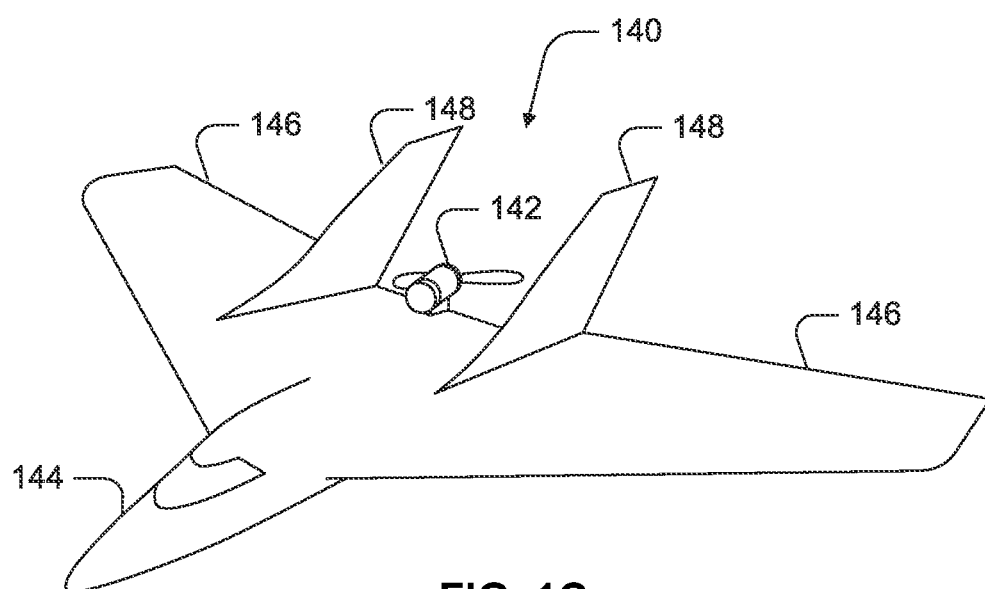
FIG. 1C is a simplified illustration of an unmanned aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
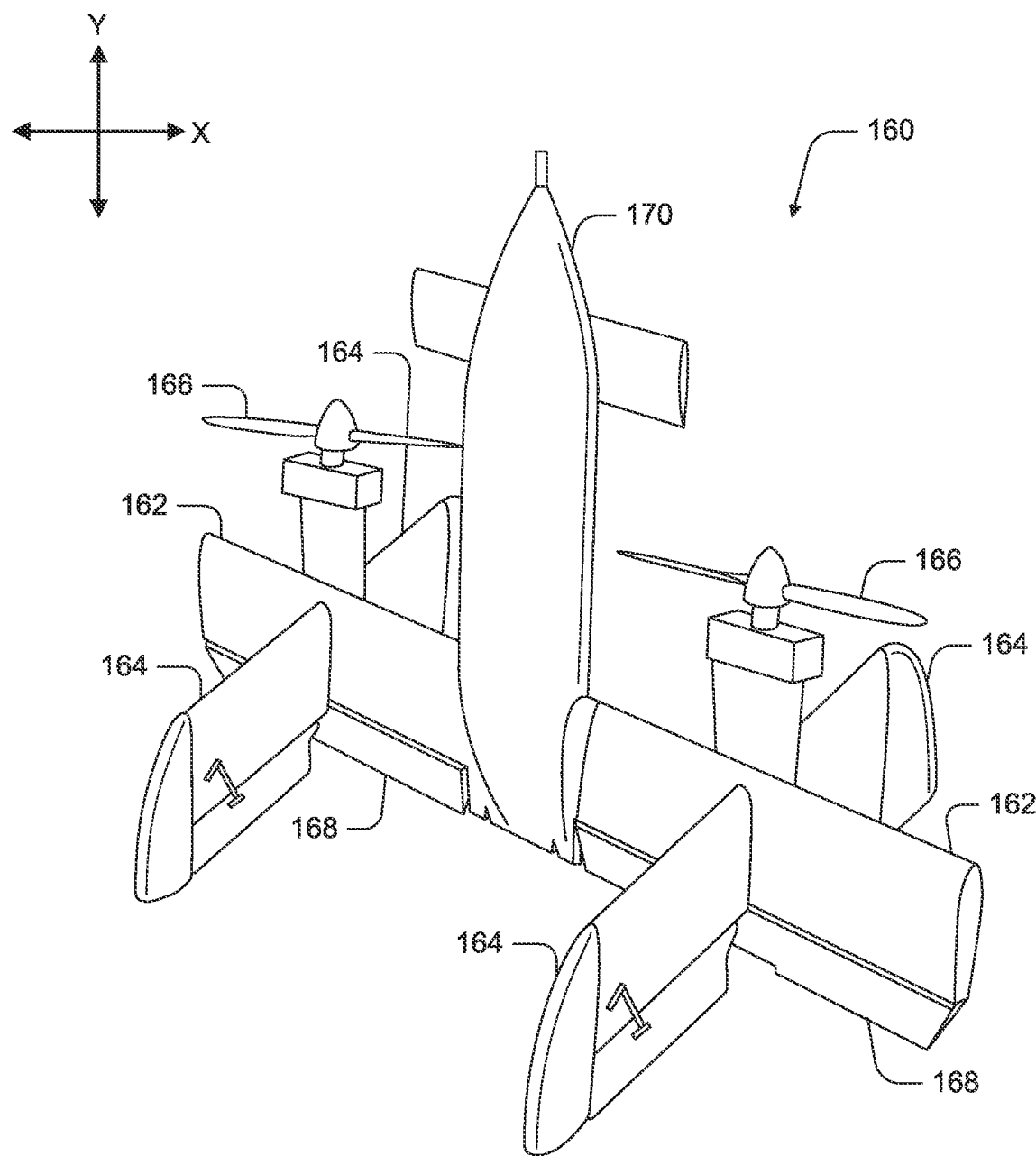
FIG. 1D is a simplified illustration of an unmanned aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
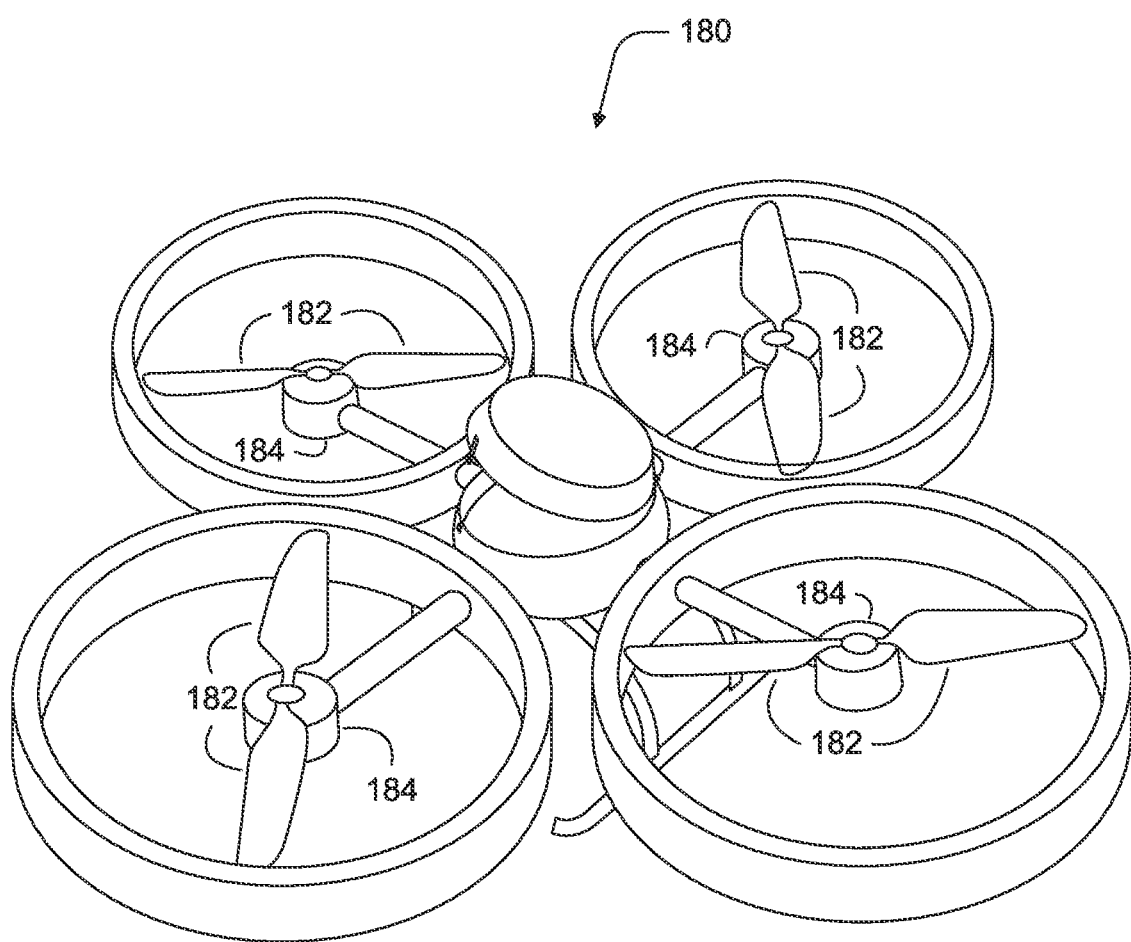
FIG. 1E is a simplified illustration of an unmanned aerial vehicle, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

Figure 2:
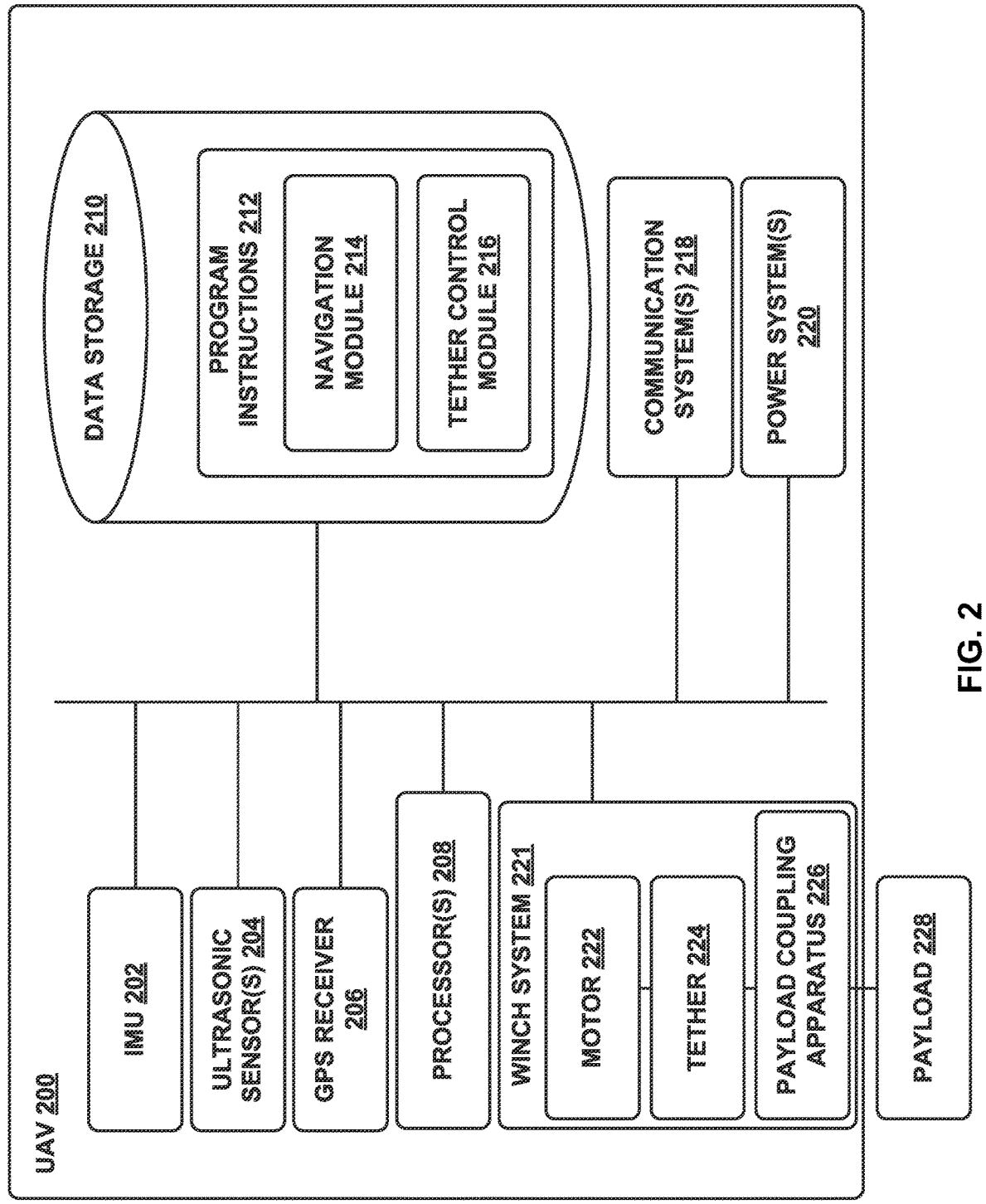
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RF ID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may contain one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) caused by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operating rate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

Figure 3:
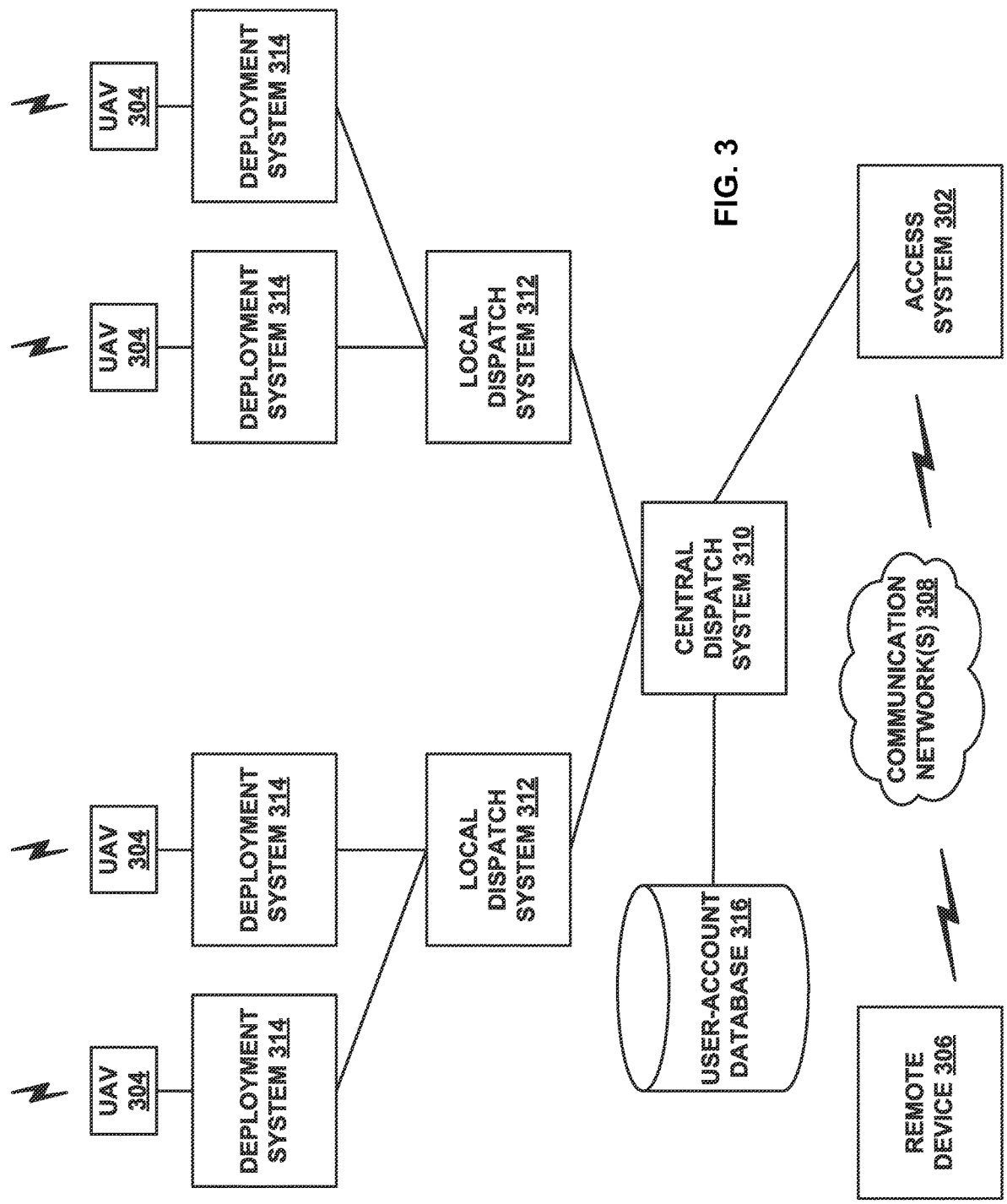
FIG. 3 is a simplified block diagram illustrating a UAV system, according to an example embodiment.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

FIGS. 4A, 4B, and 4C show a UAV 400 that includes a payload delivery system 410 (which could also be referred to as a payload delivery apparatus), according to an example embodiment. As shown, payload delivery system 410 for UAV 400 includes a tether 402 coupled to a spool 404, a payload latch 406, and a payload 408 coupled to the tether 402 via a payload coupling apparatus 412. The payload latch 406 can function to alternately secure payload 408 and release the payload 408 upon delivery. For instance, as shown, the payload latch 406 may take the form of one or more pins that can engage the payload coupling apparatus 412 (e.g., by sliding into one or more receiving slots in the payload coupling apparatus 412). Inserting the pins of the payload latch 406 into the payload coupling apparatus 412 may secure the payload coupling apparatus 412 within a receptacle 414 on the underside of the UAV 400, thereby preventing the payload 408 from being lowered from the UAV 400. In some embodiments, the payload latch 406 may be arranged to engage the spool 404 or the payload 408 rather than the payload coupling apparatus 412 in order to prevent the payload 408 from lowering. In other embodiments, the UAV 400 may not include the payload latch 406, and the payload delivery apparatus may be coupled directly to the UAV 400.

In some embodiments, the spool 404 can function to unwind the tether 402 such that the payload 408 can be lowered to the ground with the tether 402 and the payload coupling apparatus 412 from UAV 400. The payload 408 may itself be an item for delivery, and may be housed within (or otherwise incorporate) a parcel, container, or other structure that is configured to interface with the payload latch 406. In practice, the payload delivery system 410 of UAV 400 may function to autonomously lower payload 408 to the ground in a controlled manner to facilitate delivery of the payload 408 on the ground while the UAV 400 hovers above.

As shown in FIG. 4A, the payload latch 406 may be in a closed position (e.g., pins engaging the payload coupling apparatus 412) to hold the payload 408 against or close to the bottom of the UAV 400, or even partially or completely inside the UAV 400, during flight from a launch site to a target location 420. The target location 420 may be a point in space directly above a desired delivery location. Then, when the UAV 400 reaches the target location 420, the UAV's control system (e.g., the tether control module 216 of FIG. 2) may toggle the payload latch 406 to an open position (e.g., disengaging the pins from the payload coupling apparatus 412), thereby allowing the payload 408 to be lowered from the UAV 400. The control system may further operate the spool 404 (e.g., by controlling the motor 222 of FIG. 2) such that the payload 408, secured to the tether 402 by a payload coupling apparatus 412, is lowered to the ground, as shown in FIG. 4B.

Once the payload 408 reaches the ground, the control system may continue operating the spool 404 to lower the tether 402, causing over-run of the tether 402. During over-run of the tether 402, the payload coupling apparatus 412 may continue to lower as the payload 408 remains stationary on the ground. The downward momentum and/or gravitational forces on the payload coupling apparatus 412 may cause the payload 408 to detach from the payload coupling apparatus 412 (e.g., by sliding off a hook of the payload coupling apparatus 412). After releasing payload 408, the control system may operate the spool 404 to retract the tether 402 and the payload coupling apparatus 412 toward the UAV 400. Once the payload coupling apparatus reaches or nears the UAV 400, the control system may operate the spool 404 to pull the payload coupling apparatus 412 into the receptacle 414, and the control system may toggle the payload latch 406 to the closed position, as shown in FIG. 4C.

In some embodiments, when lowering the payload 408 from the UAV 400, the control system may detect when the payload 408 and/or the payload coupling apparatus 412 has been lowered to be at or near the ground based on an unwound length of the tether 402 from the spool 404. Similar techniques may be used to determine when the payload coupling apparatus 412 is at or near the UAV 400 when retracting the tether 402. As noted above, the UAV 400 may include an encoder for providing data indicative of the rotation of the spool 404. Based on data from the encoder, the control system may determine how many rotations the spool 404 has undergone and, based on the number of rotations, determine a length of the tether 402 that is unwound from the spool 404. For instance, the control system may determine an unwound length of the tether 402 by multiplying the number of rotations of the spool 404 by the circumference of the tether 402 wrapped around the spool 404. In some embodiments, such as when the spool 404 is narrow or when the tether 402 has a large diameter, the circumference of the tether 402 on the spool 404 may vary as the tether 402 winds or unwinds from the tether, and so the control system may be configured to account for these variations when determining the unwound tether length.

In other embodiments, the control system may use various types of data, and various techniques, to determine when the payload 408 and/or payload coupling apparatus 412 have lowered to be at or near the ground. Further, the data that is used to determine when the payload 408 is at or near the ground may be provided by sensors on UAV 400, sensors on the payload coupling apparatus 412, and/or other data sources that provide data to the control system.

In some embodiments, the control system itself may be situated on the payload coupling apparatus 412 and/or on the UAV 400. For example, the payload coupling apparatus 412 may include logic module(s) implemented via hardware, software, and/or firmware that cause the UAV 400 to function as described herein, and the UAV 400 may include logic module(s) that communicate with the payload coupling apparatus 412 to cause the UAV 400 to perform functions described herein.

Figure 5A:
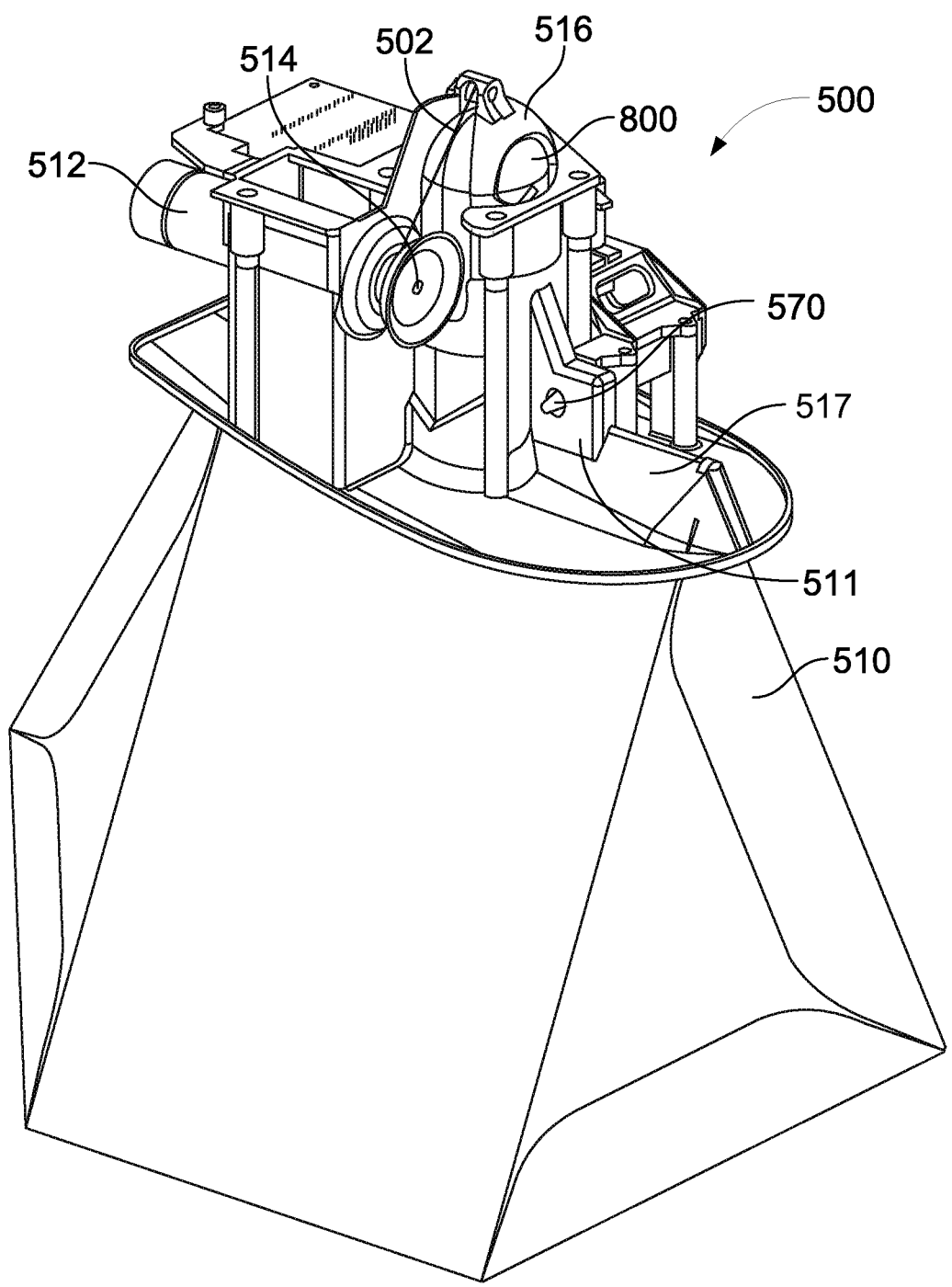
FIG. 5A is a perspective view of a payload delivery apparatus 500 including payload 510, according to an example embodiment.

FIG. 5A shows a perspective view of a payload delivery apparatus 500 including payload 510, according to an example embodiment. The payload delivery apparatus 500 is positioned within a fuselage of a UAV (not shown) and includes a winch 514 powered by motor 512, and a tether 502 spooled onto winch 514. The tether 502 is attached to a payload coupling apparatus or payload retriever 800 positioned within a payload coupling apparatus receptacle 516 positioned within the fuselage of the UAV (not shown). A payload 510 is secured to the payload coupling apparatus 800. In this embodiment a top portion 517 of payload 510 is secured within the fuselage of the UAV. A locking pin 570 is shown extending through handle 511 attached to payload 510 to positively secure the payload beneath the UAV during high speed flight.

Figure 5B:
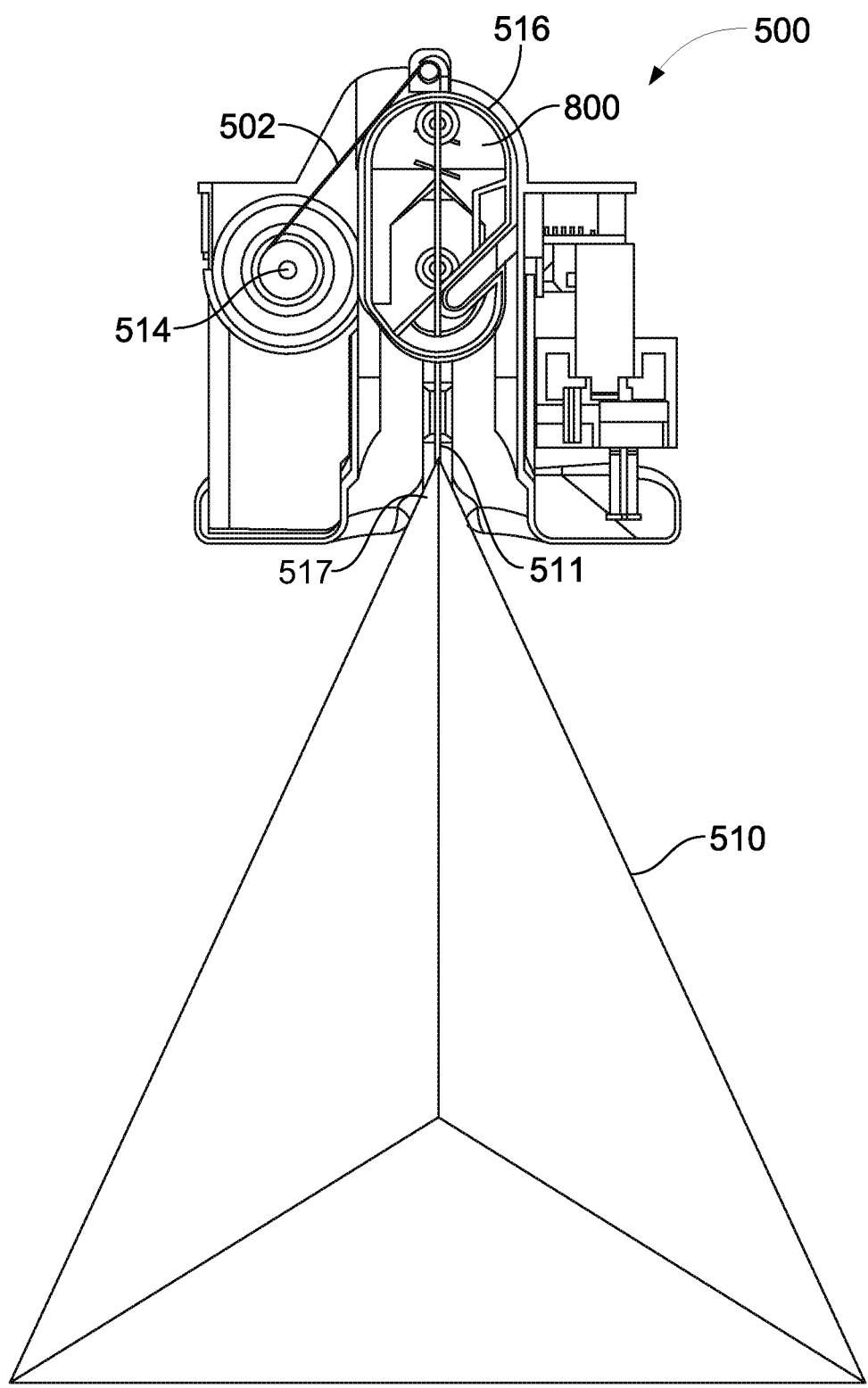
FIG. 5B is a cross-sectional side view of payload delivery apparatus 500 and payload 510 shown in FIG. 5A.

FIG. 5B is a cross-sectional side view of payload delivery apparatus 500 and payload 510 shown in FIG. 5A. In this view, the payload coupling apparatus is shown tightly positioned with the payload coupling apparatus receptacle 516. Tether 502 extends from winch 514 and is attached to the top of payload coupling apparatus 800. Top portion 517 of payload 510 is shown positioned within the fuselage of the UAV (not shown) along with handle 511.

Figure 5C:
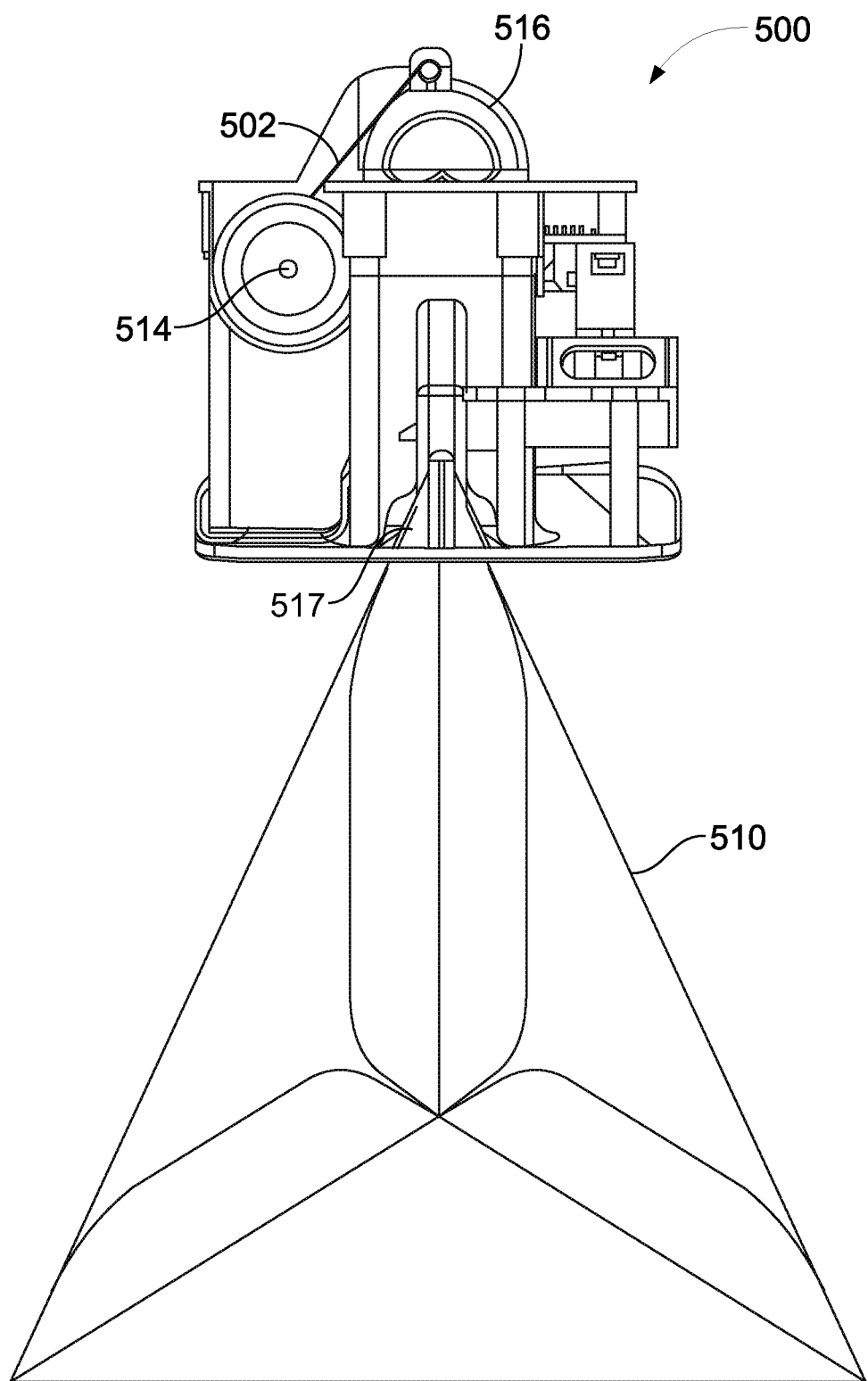
FIG. 5C is a side view of payload delivery apparatus 500 and payload 510 shown in FIGS. 5A and 5B.

FIG. 5C is a side view of payload delivery apparatus 500 and payload 510 shown in FIGS. 5A and 5B. The top portion 517 of payload 510 is shown positioned within the fuselage of the UAV. Winch 514 has been used to wind in tether 502 to position the payload coupling apparatus within payload coupling apparatus receptacle 516. FIGS. 5A-C disclose payload 510 taking the shape of an aerodynamic hexagonally-shaped tote, where the base and side walls are six-sided hexagons and the tote includes generally pointed front and rear surfaces formed at the intersections of the side walls and base of the tote providing an aerodynamic shape.

FIG. 6A is a perspective view of payload coupling apparatus 800, according to an example embodiment. Payload coupling apparatus 800 includes tether mounting point 802, and a slot 808 to position a handle of a payload handle in. Lower lip, or hook, 806 is positioned beneath slot 808. Also included is an outer protrusion 804 having helical cam surfaces 804a and 804b that are adapted to mate with corresponding cam mating surfaces within a payload coupling apparatus receptacle positioned with a fuselage of a UAV.

FIG. 6B is a side view of payload coupling apparatus 800 shown in FIG. 6A. Slot 808 is shown positioned above lower lip, or hook, 806. As shown lower lip or hook 806 has an outer surface 806a that is undercut such that it does not extend as far outwardly as an outer surface above slot 805 so that the lower lip or hook 806 will not reengage with the handle of the payload after it has been decoupled, or will not get engaged with power lines or tree branches during retrieval to the UAV.

FIG. 6C is a front view of payload coupling apparatus 800 shown in FIGS. 6A and 6B. Lower lip or hook 806 is shown positioned beneath slot 808 that is adapted for securing a handle of a payload.

Figure 7:
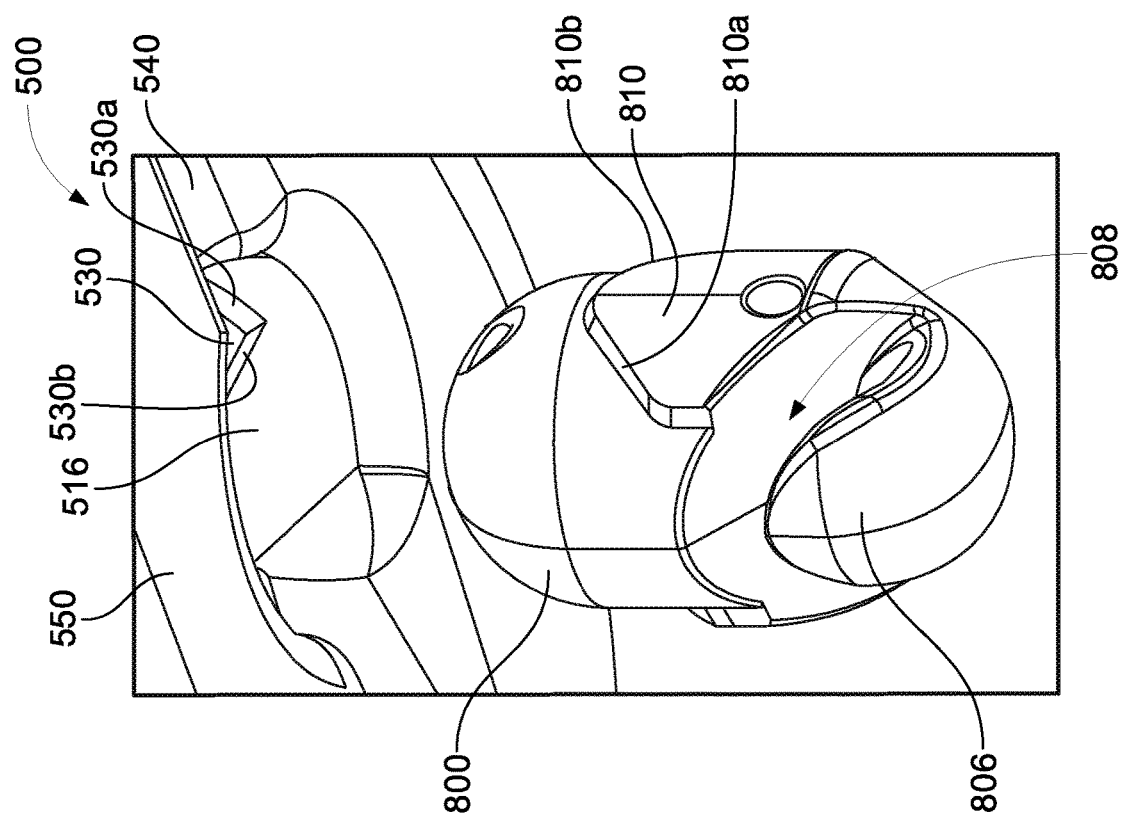
FIG. 7 is a perspective view of payload coupling apparatus 800 shown in FIGS. 6A-6C, prior to insertion into a payload coupling apparatus receptacle positioned in the fuselage of a UAV.

FIG. 7 is a perspective view of payload coupling apparatus 800 shown in FIGS. 6A-6C, prior to insertion into a payload coupling apparatus receptacle 516 positioned in the fuselage 550 of a UAV. As noted previously payload coupling apparatus 800 includes a slot 808 positioned above lower lip or hook 806, adapted to receive a handle of a payload. The fuselage 550 of the payload delivery system 500 includes a payload coupling apparatus receptacle 516 positioned within the fuselage 550 of the UAV. The payload coupling apparatus 800 includes an outer protrusion 810 have helical cammed surfaces 810a and 810b that meet in a rounded apex. The helical cammed surfaces 810a and 810b are adapted to mate with surfaces 530a and 530b of an inward protrusion 530 positioned within the payload coupling apparatus receptacle 516 positioned within fuselage 550 of the UAV. Also included is a longitudinal recessed restraint slot 540 positioned within the fuselage 550 of the UAV that is adapted to receive and restrain a top portion of a payload (not shown). As the payload coupling apparatus 800 is pulled into to the payload coupling apparatus receptacle 516, the cammed surfaces 810a and 810b of outer protrusion 810 engage with the cammed surfaces 530a and 530b within the payload coupling apparatus receptacle 516 and the payload coupling apparatus 800 is rotated into a desired alignment within the fuselage 550 of the UAV.

Figure 8:
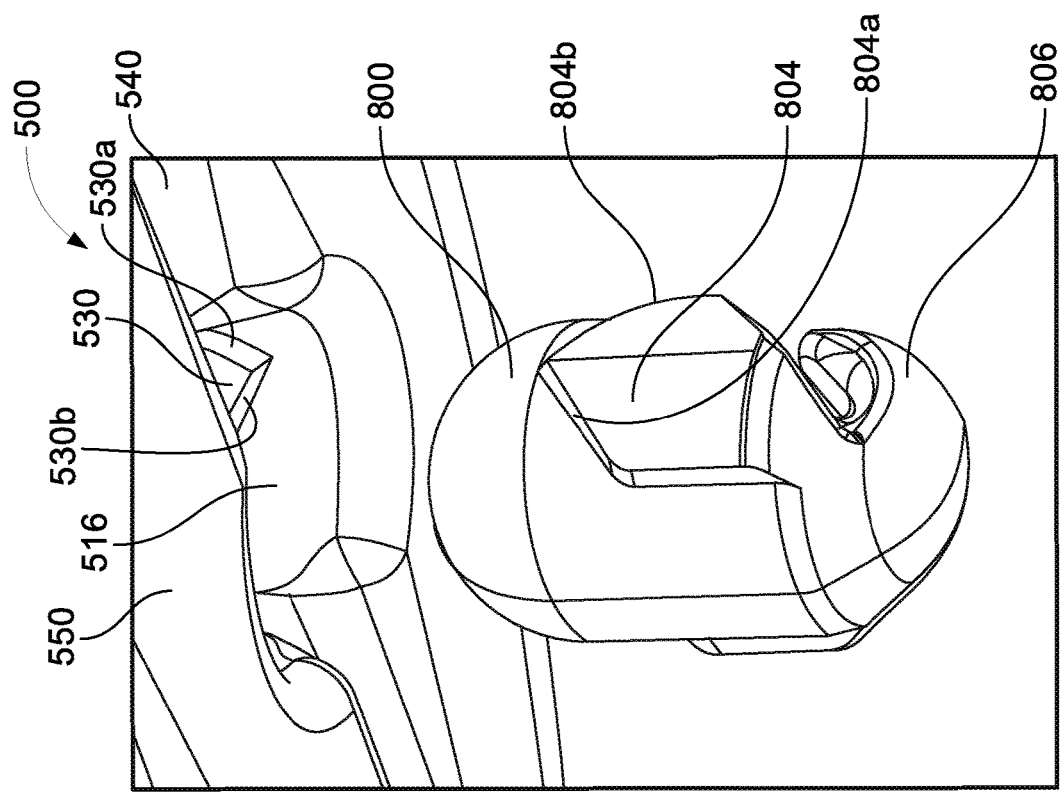
FIG. 8 is another perspective view of payload coupling apparatus 800 shown in FIGS. 6A-6C, prior to insertion into a payload coupling apparatus receptacle positioned in the fuselage of a UAV.

FIG. 8 is another perspective view of an opposite side of payload coupling apparatus 800 shown in FIGS. 6A-6C, prior to insertion into a payload coupling apparatus receptacle 516 positioned in the fuselage 550 of a UAV. As shown, payload coupling apparatus 800 include a lower lip or hook 806. An outer protrusion 804 is shown extending outwardly from the payload coupling apparatus having helical cammed surfaces 804a and 804b adapted to engage and mate with cammed surfaces 530a and 530b of inner protrusion 530 positioned within payload coupling apparatus receptacle 516 positioned within fuselage 550 of payload delivery system 500. It should be noted that the cammed surfaces 804a and 804b meet at a sharp apex, which is asymmetrical with the rounded or blunt apex of cammed surfaces 810a and 810b shown in FIG. 7. In this manner, the rounded or blunt apex of cammed surfaces 810a and 810b prevent possible jamming of the payload coupling apparatus 800 as the cammed surfaces engage the cammed surfaces 530a and 530b positioned within the payload coupling apparatus receptacle 516 positioned within fuselage 550 of the UAV. In particular, cammed surfaces 804a and 804b are positioned slightly higher than the rounded or blunt apex of cammed surfaces 810a and 810b. As a result, the sharper tip of cammed surfaces 804a and 804b engages the cammed surfaces 530a and 530b within the payload coupling apparatus receptacle 516 positioned within the fuselage 550 of payload delivery system 500, thereby initiating rotation of the payload coupling apparatus 800 slightly before the rounded or blunt apex of cammed surfaces 810a and 810b engage the corresponding cammed surfaces within the payload coupling apparatus receptacle 516. In this manner, the case where both apexes (or tips) of the cammed surfaces on the payload coupling apparatus end up on the same side of the receiving cams within the payload coupling apparatus receptacle is prevented. This scenario results in a prevention of the jamming of the payload coupling apparatus within the receptacle.

Figure 9:
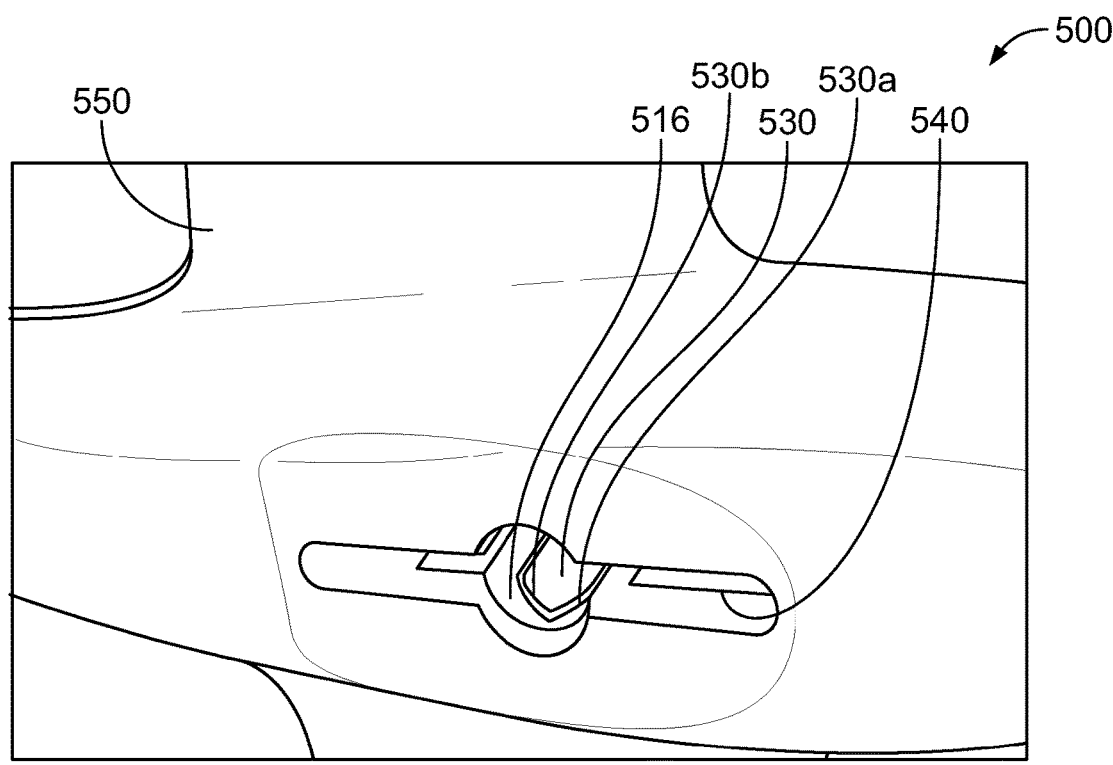
FIG. 9 shows a perspective view of a recessed restraint slot and payload coupling apparatus receptacle positioned in a fuselage of a UAV.

FIG. 9 shows a perspective view of a recessed restraint slot and payload coupling apparatus receptacle positioned in a fuselage of a UAV. In particular, payload delivery system 500 includes a fuselage 550 having a payload coupling apparatus receptacle 516 therein that includes inward protrusion 530 having cammed surfaces 530a and 530b that are adapted to mate with corresponding cammed surfaces on a payload coupling apparatus (not shown). Also included is a longitudinally extending recessed restrained slot 540 into which a top portion of a payload is adapted to be positioned and secured within the fuselage 550.

Figure 10A:
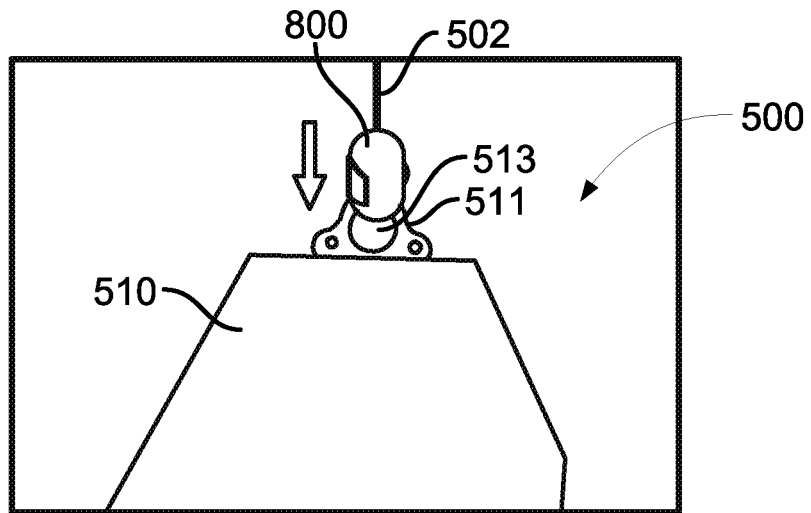
FIG. 10A shows a side view of a payload delivery apparatus 500 with a handle 511 of payload 510 secured within a payload coupling apparatus 800 as the payload 510 moves downwardly prior to touching down for delivery.

FIG. 10A shows a side view of a payload delivery apparatus 500 with a handle 511 of payload 510 secured within a payload coupling apparatus 800 as the payload 510 moves downwardly prior to touching down for delivery. Prior to payload touchdown, the handle 511 of payload 510 includes a hole 513 through which a lower lip or hook of payload coupling apparatus 800 extends. The handle sits within a slot of the payload coupling apparatus 800 that is suspended from tether 502 of payload delivery system 500 during descent of the payload 510 to a landing site.

Figure 10B:
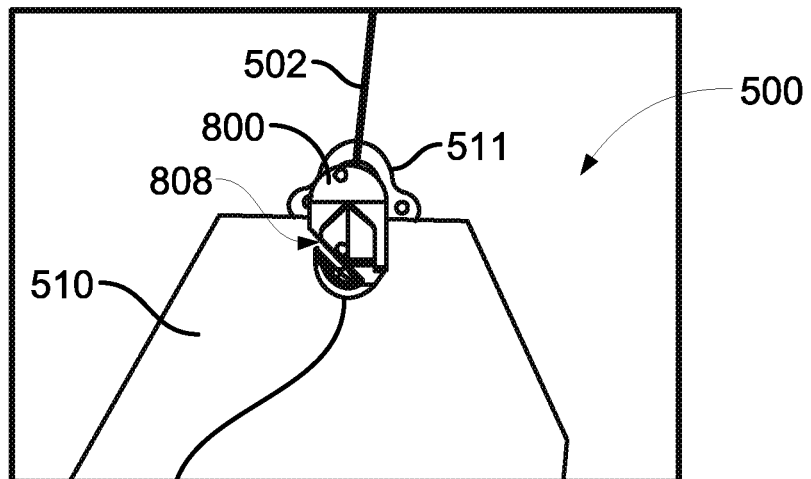
FIG. 10B shows a side view of payload delivery apparatus 500 after payload 510 has landed on the ground showing payload coupling apparatus 800 decoupled from handle 511 of payload 510.

FIG. 10B shows a side view of payload delivery apparatus 500 after payload 510 has landed on the ground showing payload coupling apparatus 800 decoupled from handle 511 of payload 510. Once the payload 510 touches the ground, the payload coupling apparatus 800 continues to move downwardly (as the winch further unwinds) through inertia or gravity and decouples the lower lip or hook 808 of the payload coupling apparatus 800 from handle 511 of payload 510. The payload coupling apparatus 800 remains suspended from tether 502, and can be winched back up to the payload coupling receptacle of the UAV.

Figure 10C:
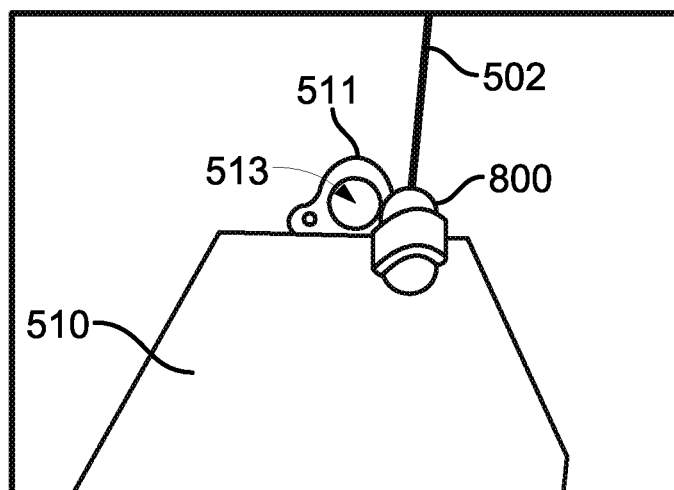
FIG. 10C shows a side view of payload delivery apparatus 500 with payload coupling apparatus 800 moving away from handle 511 of payload 510.

FIG. 10C shows a side view of payload delivery apparatus 500 with payload coupling apparatus 800 moving away from handle 511 of payload 510. Here the payload coupling apparatus 800 is completely separated from the hole 513 of handle 511 of payload 510. Tether 502 may be used to winch the payload coupling apparatus back to the payload coupling apparatus receptacle positioned in the fuselage of the UAV.

Figure 11A:
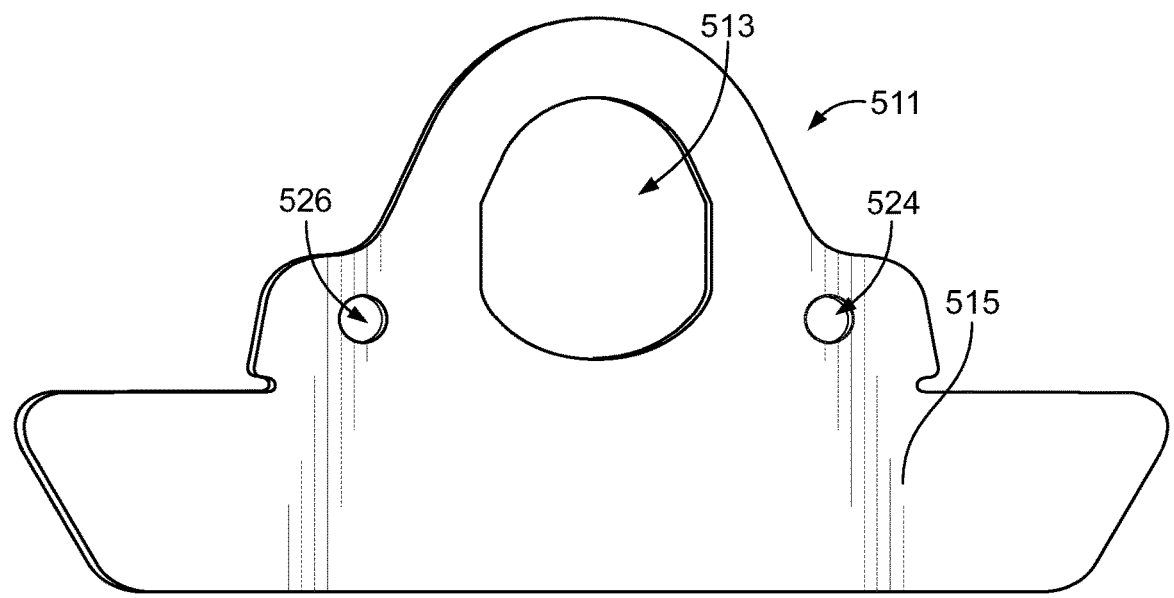
FIG. 11A is a side view of handle 511 of payload 510 having openings 524 and 526 adapted to receive pins positioned on a payload holder, according to an example embodiment.

FIG. 11A is a side view of handle 511 of payload 510. The handle 511 includes an aperture 513 through which the lower lip or hook of a payload coupling apparatus extends through to suspend the payload during delivery, or for retrieval. The handle 511 includes a lower portion 515 that is secured to the top portion of a payload. Also included are holes 524 and 526 through which locking pins positioned within the fuselage of a UAV, may extend to secure the handle and payload in a secure position during high speed forward flight to a delivery location. In addition, holes 524 and 526 are also designed for pins of a payload holder to extend therethrough to hold the payload in position for retrieval on a payload retrieval apparatus. The handle may be comprised of a thin, flexible plastic material that is flexible and provides sufficient strength to suspend the payload beneath a UAV during forward flight to a delivery site, and during delivery and/or retrieval of a payload. In practice, the handle may be bent to position the handle within a slot of a payload coupling apparatus. The handle 511 also has sufficient strength to withstand the torque during rotation of the payload coupling apparatus into the desired orientation within the payload coupling apparatus receptacle, and rotation of the top portion of the payload into position with the recessed restraint slot.

Figure 11B:
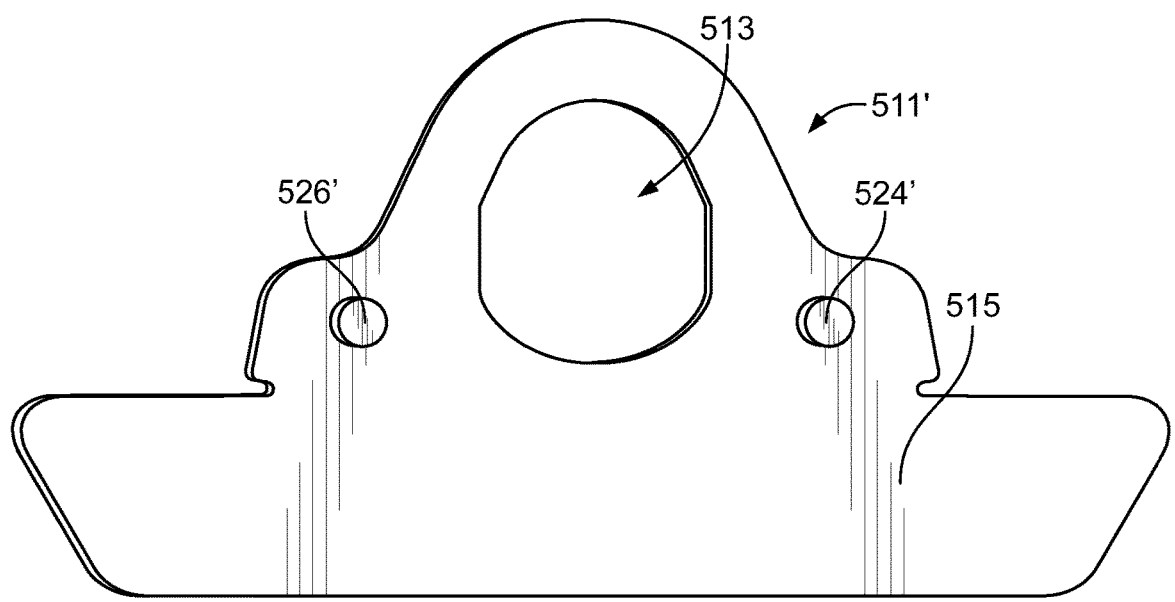
FIG. 11B is a side view of handle 511' of a payload having magnets 524' and 526' positioned thereon for magnetic engagement with a payload holder, according to an example embodiment.

FIG. 11B is a side view of handle 511' of payload 510. The handle 511' includes an aperture 513 through which the lower lip or hook of a payload coupling apparatus extends through to suspend the payload during delivery, or for retrieval. The handle 511' includes a lower portion 515 that is secured to the top portion of a payload. Also included are magnets 524' and 526' adapted for magnetic engagement with corresponding magnets (or a metal) of a payload holder to secure the payload to the payload holder in position for retrieval on a payload retrieval apparatus. In some examples, magnets 524' and 526' are provided on a handle (e.g., handle 511 or 511') in place of holes 524 and 526. In other examples, magnets 524' and 526' are provided in addition to holes 524 and 526.

Figure 12:
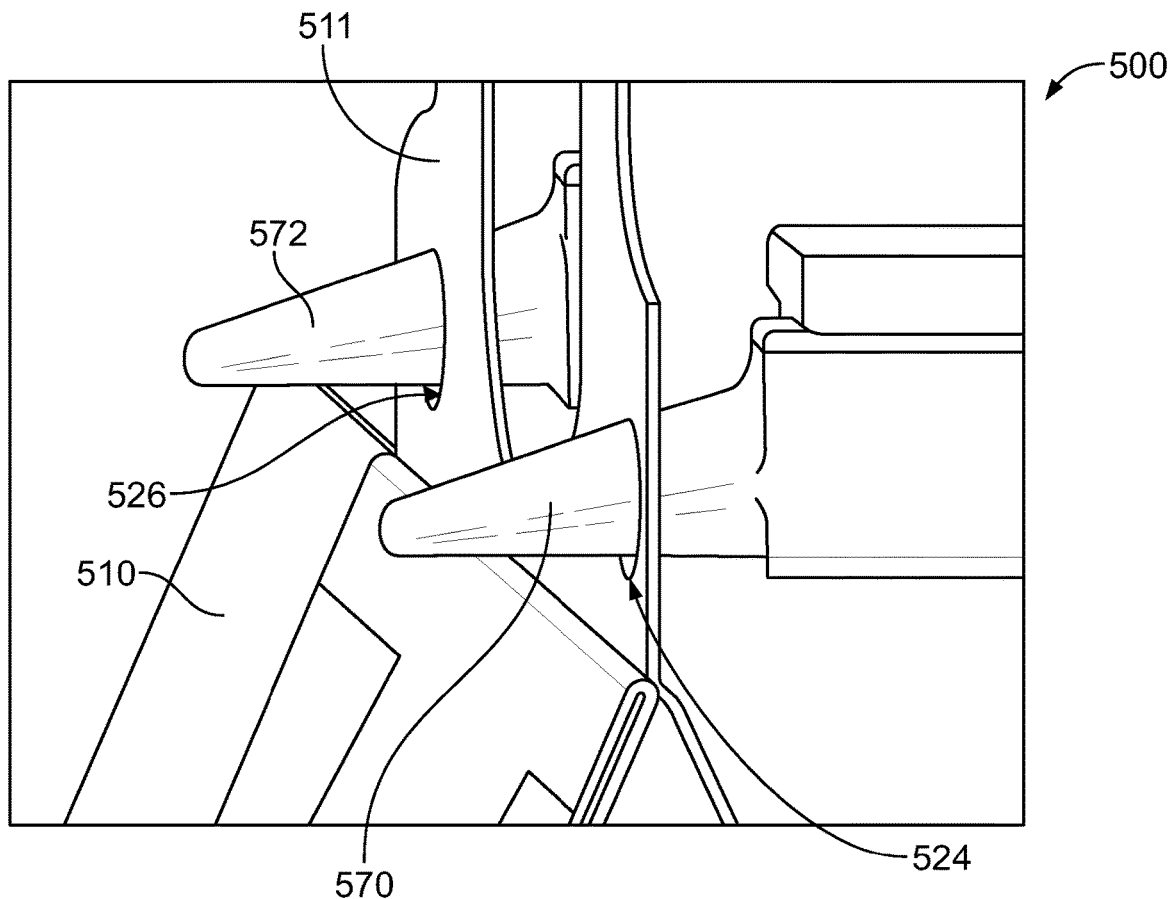
FIG. 12 shows a pair of locking pins 570, 572 extending through holes 524 and 526 in handle 511 of payload 510 to secure the handle 511 and top of payload 510 within the fuselage of a UAV, or to secure the handle 511 to a payload holder on a payload retrieval apparatus.

FIG. 12 shows a pair of pins 570, 572 extending through holes 524 and 526 in handle 511 of payload 510 to secure the handle 511 and top portion of payload 510 within the fuselage of a UAV, or to secure payload 510 to a payload holder of a payload retrieval apparatus. In this manner, the handle 511 and payload 510 may be secured within the fuselage of a UAV, or to a payload holder of a payload retrieval apparatus. In this embodiment, the pins 570 and 572 have a conical shape so that they pull the package up slightly or at least remove any downward slack present. In some embodiments the pins 570 and 572 may completely plug the holes 524 and 526 of the handle 511 of payload 510, to provide a secure attachment of the handle and top portion of the payload within the fuselage of the UAV, or to secure the payload to a payload retrieval apparatus. Although the pins are shown as conical, in other applications they may have other geometries, such as a cylindrical geometry.

Figure 13A:
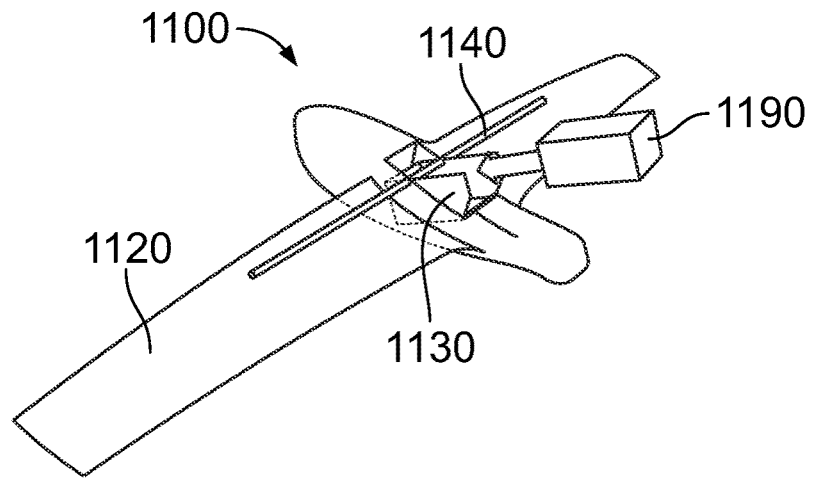
FIG. 13A is a perspective top view of UAV 1100 having rotatable cargo bay 1130 illustrating payload 1190 being loaded into rotatable cargo bay 1130.
Figure 13B:
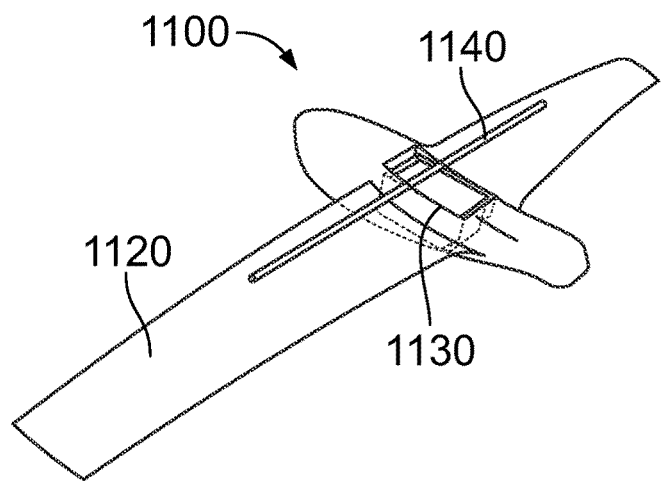
FIG. 13B is another perspective top view of UAV 1100 with payload 1190 positioned in rotatable cargo bay 1130 during flight.
Figure 13C:
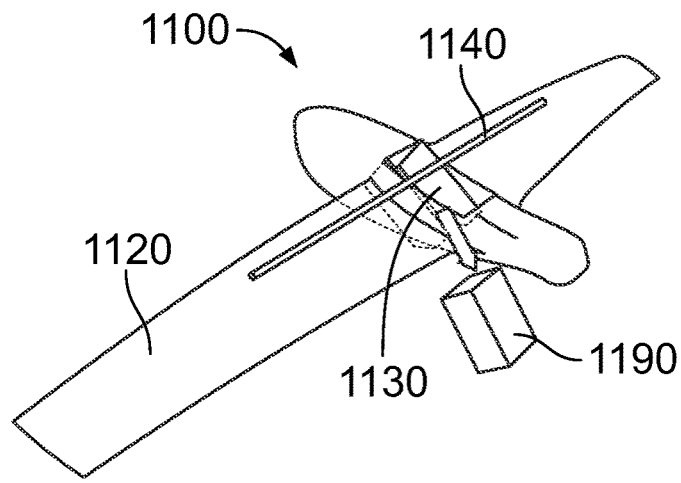
FIG. 13C is a perspective top view of UAV 1100 with payload 1190 being dropped from rotatable cargo bay 1130.

FIG. 13A is a perspective top view of UAV 1100 having rotatable cargo bay 1130 illustrating payload 1190 being loaded into rotatable cargo bay 1130; FIG. 13B is another perspective top view of UAV 1100 with payload 1190 positioned in rotatable cargo bay 1130 during flight; and FIG. 13C is a perspective top view of UAV 1100 with payload 1190 being dropped from rotatable cargo bay 1130.

Payload 1190 is illustrated being positioned into rotatable cargo bay 1130 of UAV 1100 in FIG. 13A. In FIG. 13A, the payload 1190 is loaded into rotatable cargo bay 1130 after rotatable cargo bay 1130 has been rotated upwardly into a first position where an entrance 1134 (identified in the Figures below) of the rotatable cargo bay 1130 is positioned above the fuselage body of the UAV 1100 to allow for entry of the payload 1190 into the rotatable cargo bay 1130, and the rotatable cargo bay 1130 extends through an opening in an upper surface of the fuselage body of the UAV 1100.

FIG. 13B illustrates rotatable cargo bay 1130 after having been rotated into a second position where the entrance 1134 of the rotatable cargo bay 1130 is positioned within the fuselage body of the UAV 1100 during transport of the payload 1190. FIG. 13C illustrates rotatable cargo bay 1130 after having been rotated into a third position where the entrance 1134 of the rotatable cargo bay 1130 is positioned below the fuselage body of UAV 1100 to allow for exiting of the payload 1190 from the rotatable cargo bay 1130, and the rotatable cargo bay 1130 extends through an opening in a lower surface of the fuselage body of UAV 1100. In FIG. 13B, UAV 1100 is shown during forward flight transporting payload 1190 within rotatable cargo bay 1130. In FIG. 13C, payload 1190 is shown being dropped from the entrance 1134 of rotatable cargo bay 1130 and exiting UAV 1100 at a delivery site.

Figure 14A:
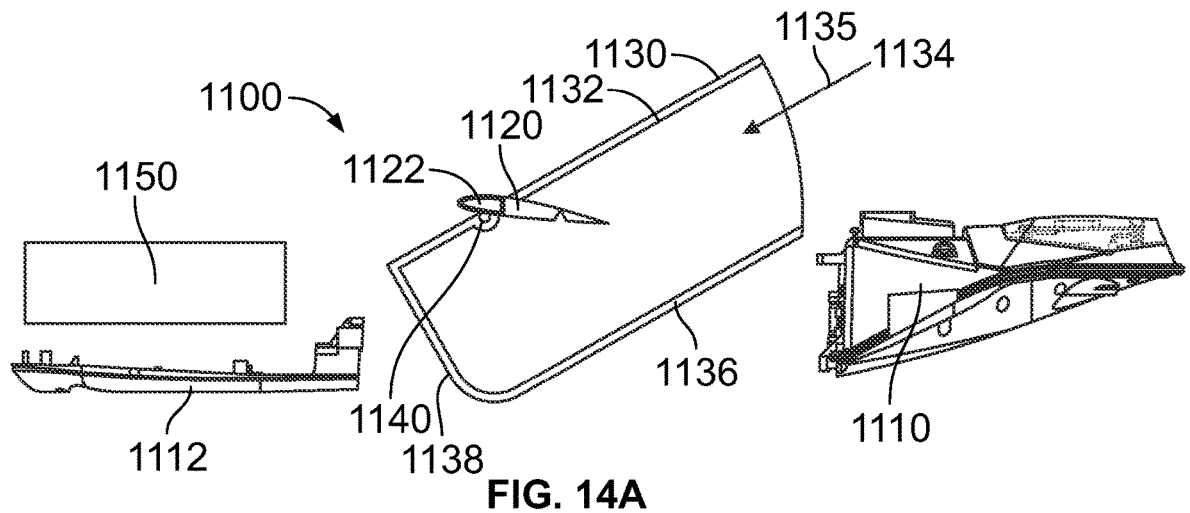
FIG. 14A is a side view of UAV 1100 with a rotatable cargo bay 1130 for holding a payload shown in a first position.

FIG. 14A is a side view of UAV 1100 with a rotatable cargo bay 1130 for holding a payload shown in a first position with rotatable cargo 1130 rotated upwardly so that entrance 1134 is positioned above the fuselage body of UAV 1100. UAV 1100 includes fuselage body 1110, 1112 and battery package 1150. Rotatable cargo bay 1130 includes upper side 1132, lower side, and rear side 1138. In FIG. 14A, a payload can be placed in rotatable cargo bay 1130 through entrance 1134 in the direction of arrow 1135. Rotatable cargo bay 1130 is pivotally mounted to pivot axis 1140 beneath wing spar 1122, and extends within a cutout in wing 1120 when in the first position shown in FIG. 14A.

Figure 14B:
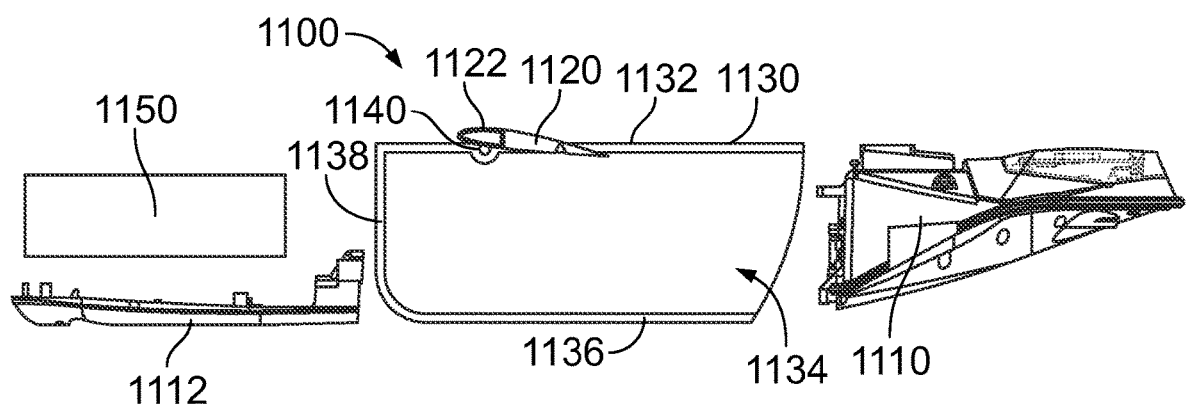
FIG. 14B is a side view of UAV 1100 with rotatable cargo bay 1130 shown in a second position.
Figure 14C:
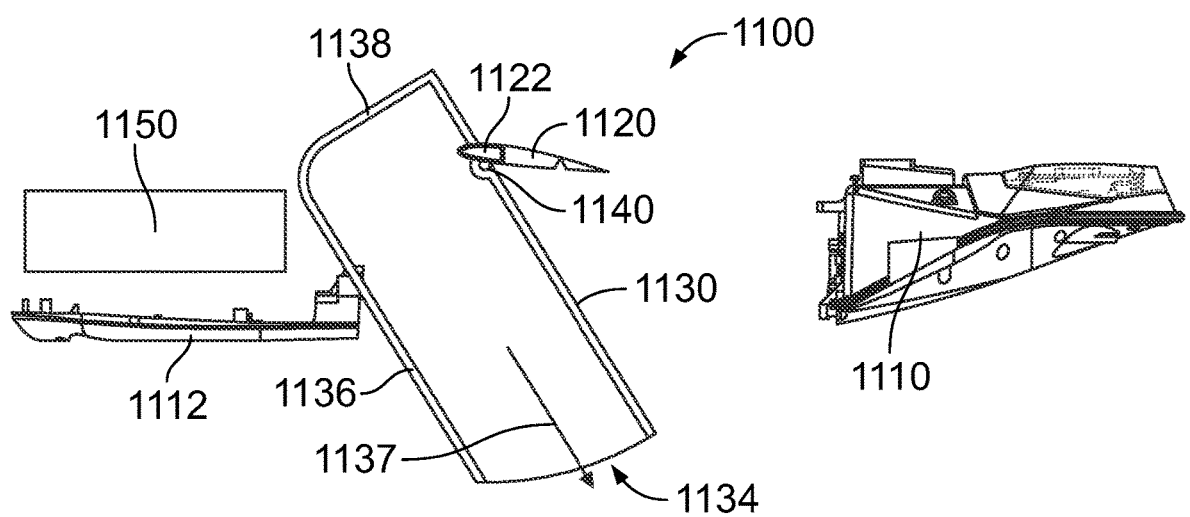
FIG. 14C is a side view of UAV 1100 with rotatable cargo bay 1130 shown in a third position.
Figure 14D:
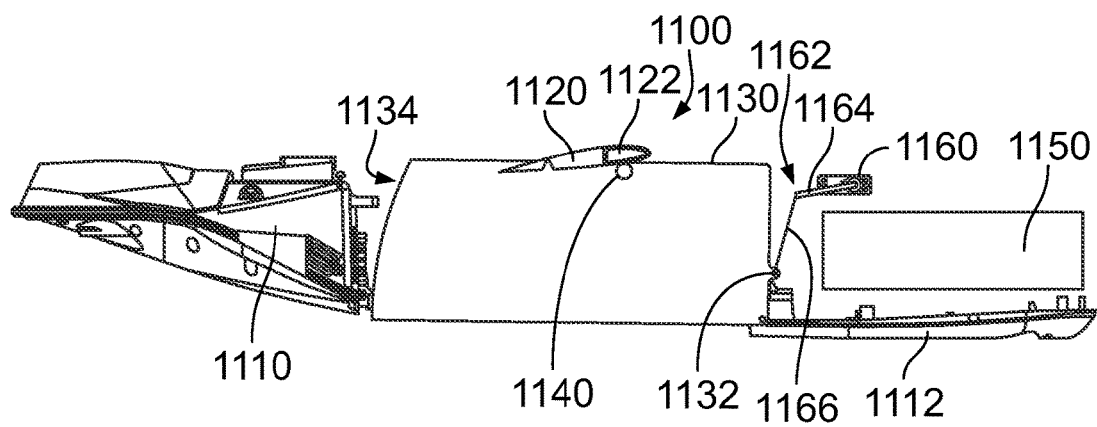
FIG. 14D is a side view of UAV 1100 with rotatable cargo bay 1130 shown in the second position with actuator 1160 positioned in the fuselage body of UAV 1100.
Figure 14E:
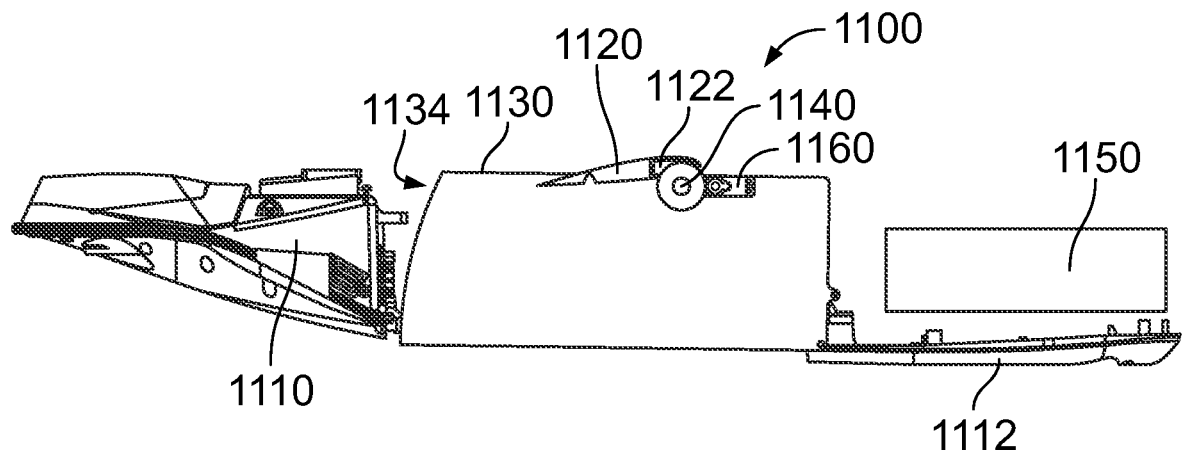
FIG. 14E is a side view of UAV 1100 with rotatable cargo bay 1130 shown in the second position with actuator 1160 positioned on rotatable cargo bay 1130 of UAV 1100.
Figure 14F:
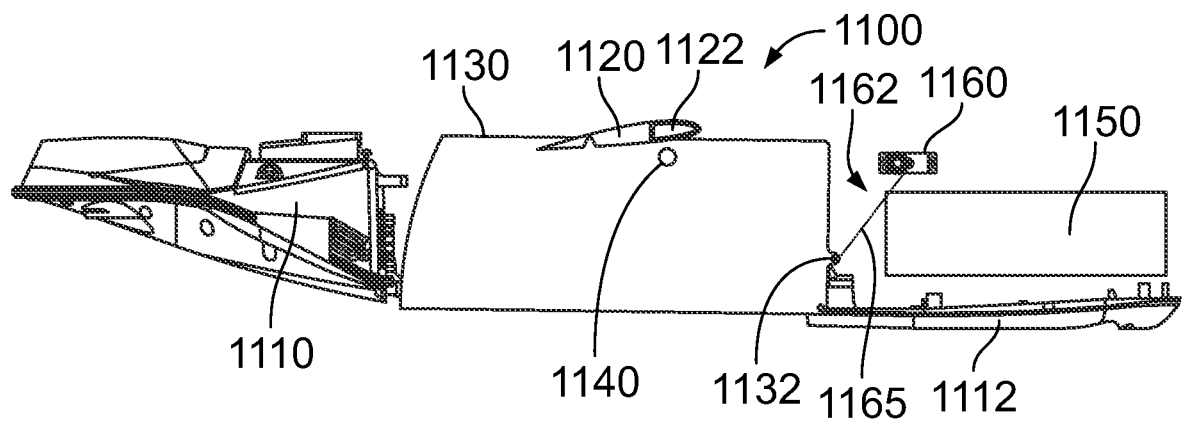
FIG. 14F is a side view of UAV 1100 with rotatable cargo bay 1130 shown in the second position with actuator 1160 positioned in the fuselage body of UAV 1100.

FIGS. 14B and 14E-14F are side views of UAV 1100 with rotatable cargo bay 1130 shown in a second position where entrance 1134 of rotatable cargo bay 1130 is positioned with the fuselage body 1110, 1112 of UAV 1100 for forward flight. FIG. 14C is a side view of UAV 1100 with rotatable cargo bay 1130 shown in a third position where rotatable cargo bay 1130 extends downwardly through the opening in fuselage body 1110, 1112 such that the entrance 1134 to rotatable cargo bay 1130 is positioned beneath fuselage body 1110, 1112 of UAV 1100. In the third position, the payload can exit rotatable cargo bay 1130 through entrance 1134 in the direction of arrow 1137 and be dropped at a delivery site. FIG. 14D is a side view of UAV 1100 with rotatable cargo bay 1130 shown in the second position with actuator 1160 positioned in the fuselage body 1110, 1112 of UAV 1100. Actuator 1160 includes a linkage assembly 1162 with linkage arms 1164 and 1166 that ultimately are attached to boss 1132 on rotatable cargo bay 1130. Linkage arms 1164 and 1166 of linkage assembly 1162 are moved by actuator 1160 to rotate rotatable cargo bay 1130 upwardly about pivot axis 1140 into the first position and downwardly into the third position. FIG. 14E is a side view of UAV 1100 of rotatable cargo bay 1130 shown in the second position with actuator 1160 positioned on rotatable cargo bay 1130 of UAV 1100. Actuator 1160 is operable to rotate rotatable cargo bay 1130 upwardly about pivot axis 1140 into the first position and downwardly into the third position. FIG. 14F is a side view of UAV 1100 with rotatable cargo bay 1130 shown in the second position with actuator 1160 positioned in the fuselage body 1110, 1112 of UAV 1100. In FIG. 14F, actuator 1160 utilizes string 1165 which may be wound in and wound out to rotate rotatable cargo bay 1130 about pivot axis 1140 into the first position and downwardly into the third position.

Figure 15A:
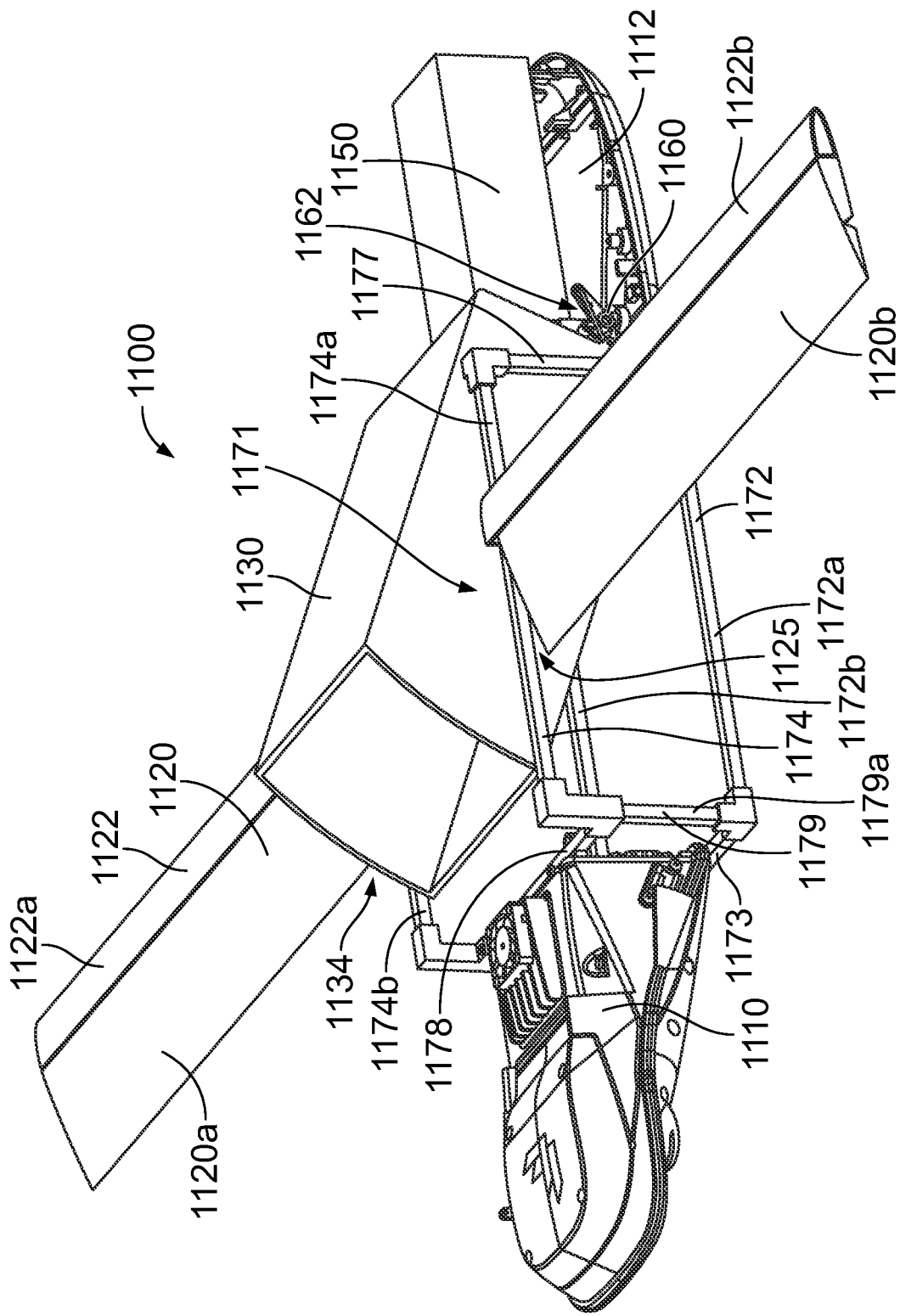
FIG. 15A is a perspective side view of UAV 1100 with rotatable cargo bay 1130 in a first position.

FIG. 15A is a perspective side view of UAV 1100 with rotatable cargo bay 1130 in a first position with rotatable cargo 1130 rotated upwardly so that entrance 1134 is positioned above the fuselage body 1110, 1112 of UAV 1100. UAV 1100 includes fuselage body 1110, 1112 and battery package 1150. In FIG. 15A, rotatable cargo bay 1130 is in the first position where a payload can be placed in rotatable cargo bay 1130 through entrance 1134. Rotatable cargo bay 1130 is pivotally mounted to pivot axis 1140, and extends within a cutout 1125 between wing portions 1120a and 1120b in wing 1120, and first side 1122a of wing spar 1122 and second side 1122b of wing spar 1122 when in the first position shown in FIG. 15A. Actuator 1160 and linkage assembly 1162 which is attached to boss 1132 on rotatable cargo bay 1130 are operable to rotate rotatable cargo bay 1130 upwardly into the first position shown in FIG. 15A.

In FIGS. 15A-15F, UAV 1100 includes a cargo bay frame 1171 having upper longitudinal members 1174a and 1174b, lower longitudinal members 1172a and 1172b, vertical members 1177a and 1177b and 1179a and 1179b attached to longitudinal members 1174a, 1174b, 1172a, and 1172b and also attached to cross members 1173. Rotatable cargo bay 1130 is positioned within cargo bay frame 1171, and in the first position is positioned between upper longitudinal members 1174a and 1174b.

Figure 15B:
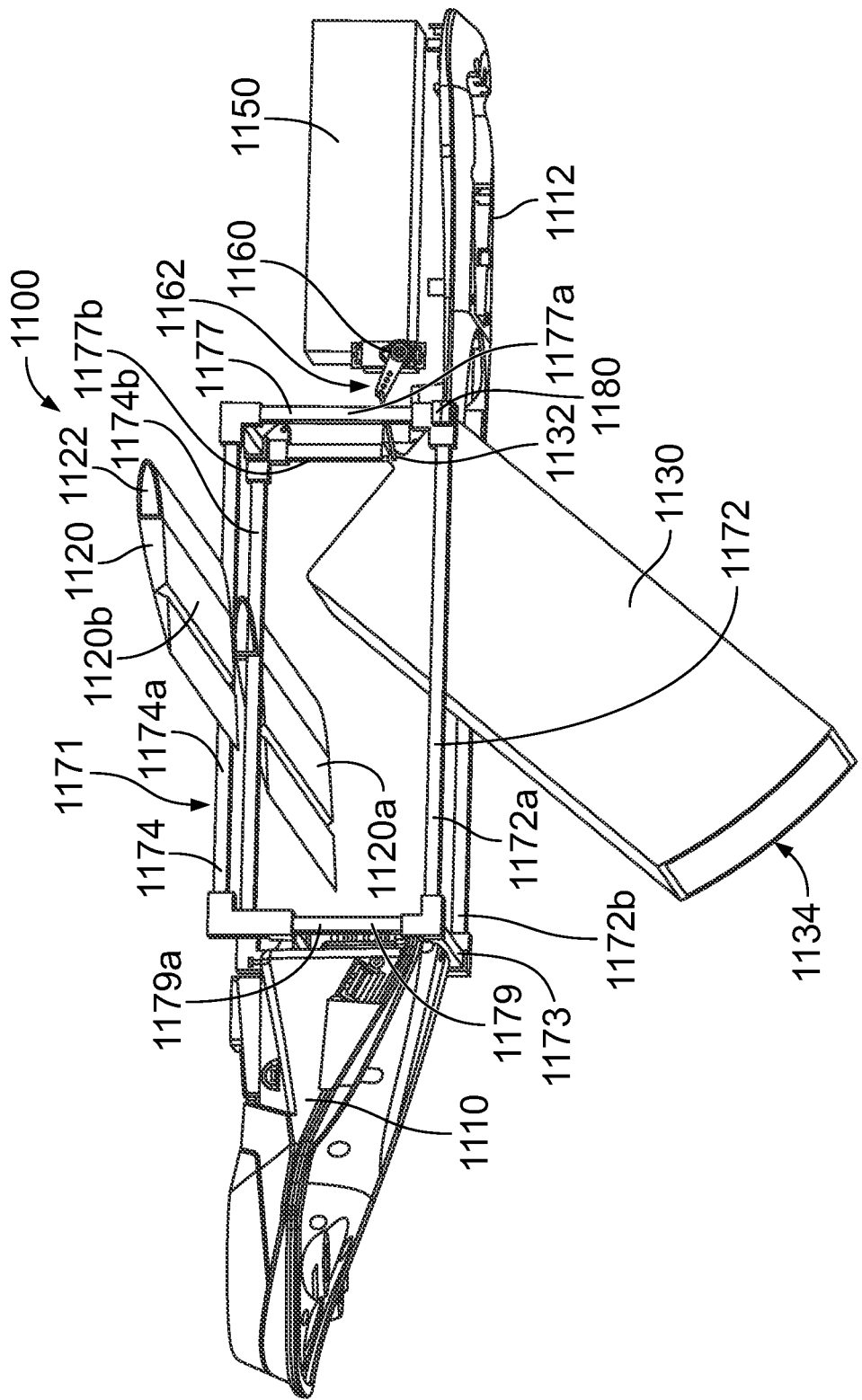
FIG. 15B is a perspective side view of UAV 1100 with rotatable cargo bay 1130 in a third position.

FIG. 15B is a perspective side view of UAV 1100 with rotatable cargo bay 1130 in a third position. In the third position, rotatable cargo bay 1130 has been rotated downwardly and is positioned between lower longitudinal members 1172a and 1172b. In FIGS. 15A-15F, rotatable cargo bay 1130 is rotatable about a pivot axis 1140 located at an intersection 1180 between lower longitudinal members 1172a and 1172b and vertical members 1177a and 1177b.

Figure 15C:
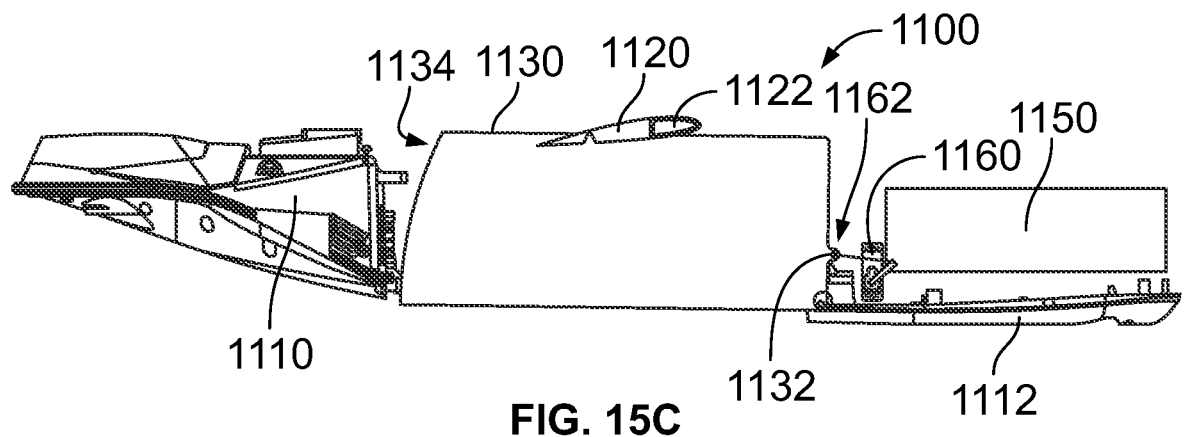
FIG. 15C is a side view of UAV 1100 with rotatable cargo bay 1130 shown in the second position with actuator 1160 positioned on the fuselage body of UAV 1100.
Figure 15D:
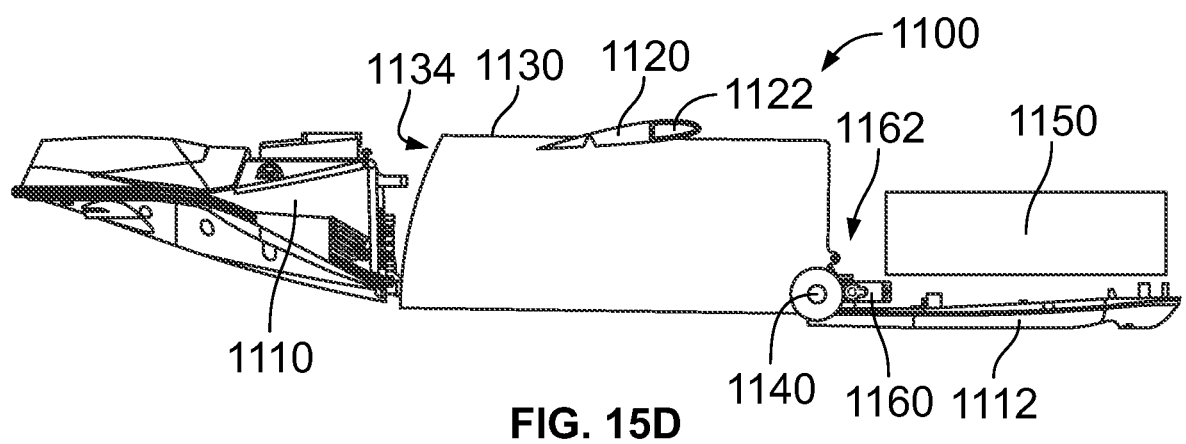
FIG. 15D is a side view of UAV 1100 with rotatable cargo bay 1130 shown in the second position with actuator 1160 positioned on rotatable cargo bay 1130 of UAV 1100.
Figure 15E:
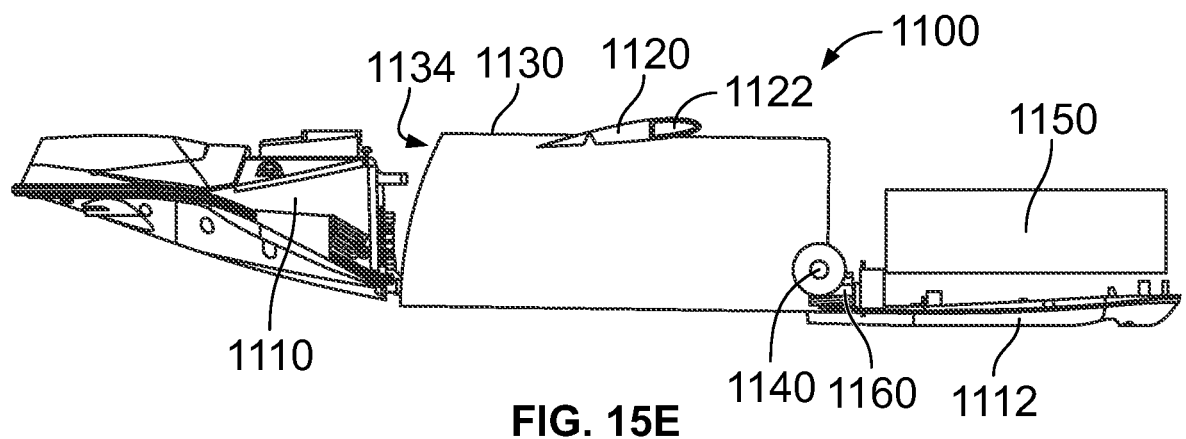
FIG. 15E is a side view of UAV 1100 with rotatable cargo bay 1130 shown in the second position with actuator 1160 positioned on rotatable cargo bay 1130 of UAV 1100.
Figure 15F:
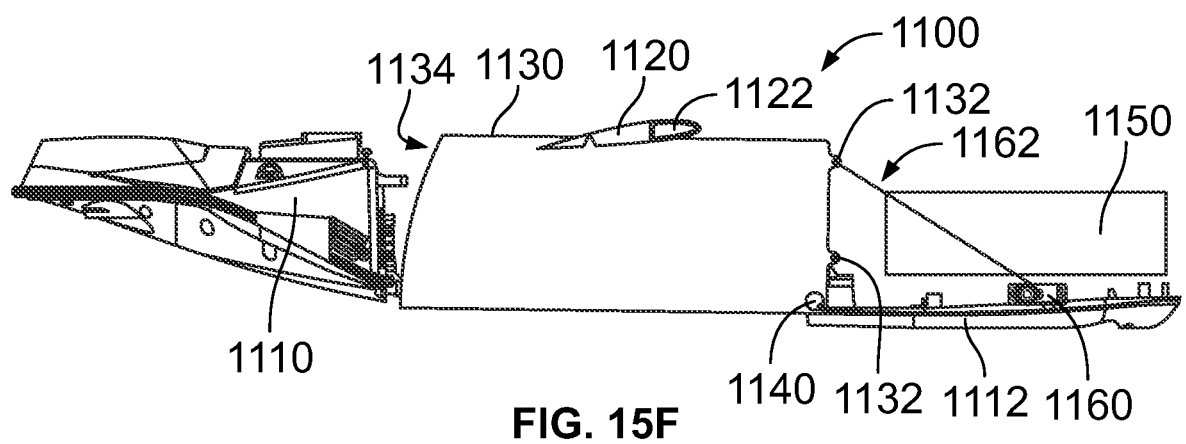
FIG. 15F is a side view of UAV 1100 with rotatable cargo bay 1130 shown in the second position with actuator 1160 positioned on rotatable cargo bay 1130 of UAV 1100.

FIG. 15C is a side view of UAV 1100 with rotatable cargo bay 1130 shown in the second position with actuator 1160 positioned on the fuselage body 1112 of UAV 1100 between battery package 1150 and rotatable cargo bay 1130. FIG. 15D is a side view of UAV 1100 with rotatable cargo bay 1130 shown in the second position with actuator 1160 positioned on the fuselage body 1112 of UAV 1100 adjacent pivot axis 1140. FIG. 15E is a side view of UAV 1100 with rotatable cargo bay 1130 shown in the second position with actuator 1160 positioned on fuselage body 1112 of UAV 1100 beneath pivot axis 1140. FIG. 15F is a side view of UAV 1100 with rotatable cargo bay 1130 shown in the second position with actuator 1160 positioned on fuselage body 1112 of UAV 1100 beneath battery package 1150.

Figure 16A:
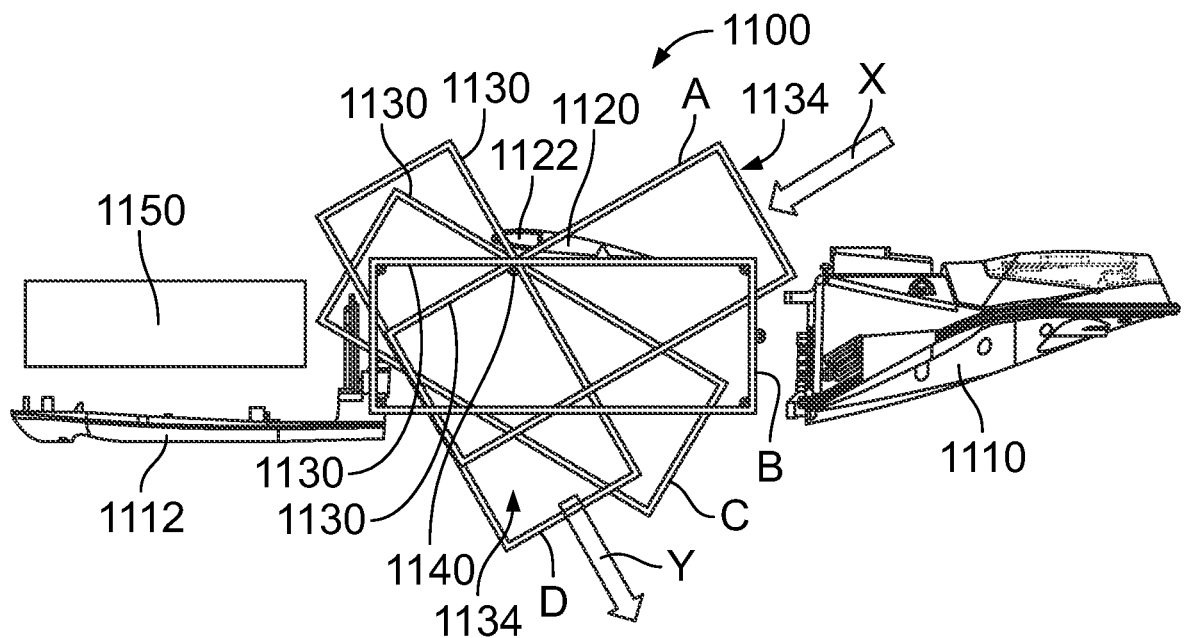
FIG. 16A is a side view of UAV 1100 shown with rotatable cargo bay 1130 rotating through positions A-D with lateral pivot axis 1140 positioned under wing spar 1122.
Figure 16B:
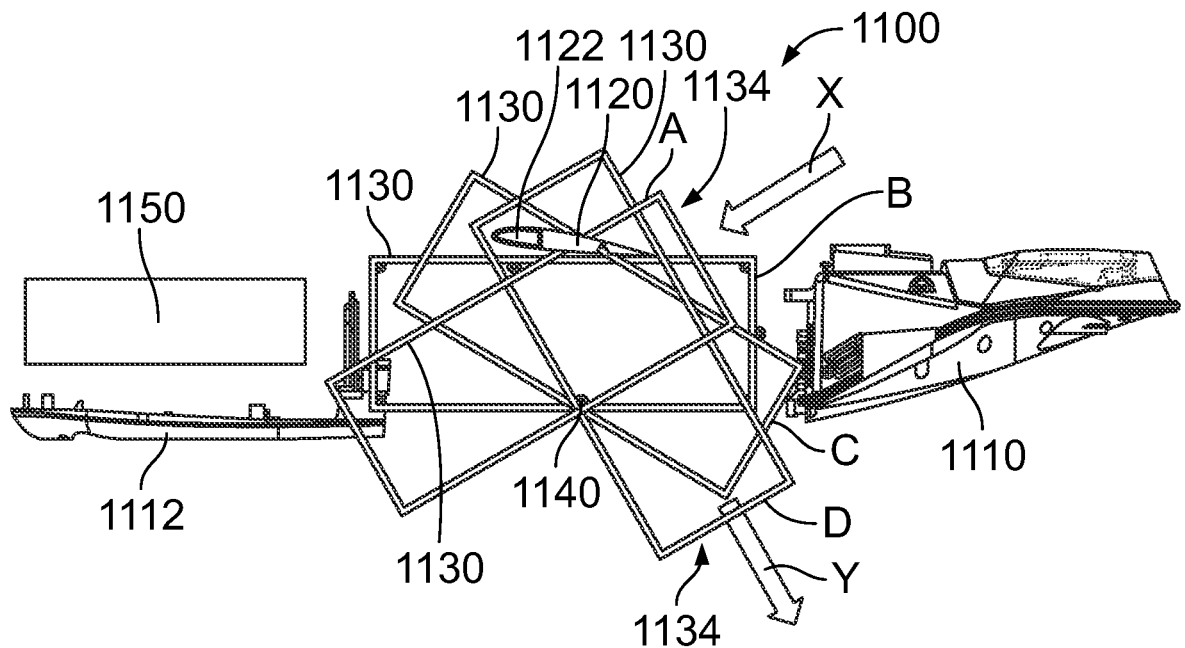
FIG. 16B is a side view of UAV 1100 shown with rotatable cargo bay 1130 rotating through positions A-D with lateral pivot axis 1140 positioned on a center portion of lower longitudinal members of a frame in UAV 1100.

FIGS. 16A-16B, 17A-17C, and 18A-18C illustrate rotatable cargo bay 1130 rotating through positions A-D about lateral pivot axis 1140. UAV 1100 includes fuselage body 1110, 1112 and battery package 1150. FIG. 16A is a side view of UAV 1100 shown with rotatable cargo bay 1130 rotating about with lateral pivot axis 1140 positioned under wing spar 1122 of wing 1120. In position A, also referred to as the first position, rotatable cargo bay 1130 has been upwardly rotated and extends within a cutout in wing 1120 behind wing spar 1120. FIG. 16B is a side view of UAV 1100 shown with lateral pivot axis 1140 positioned on a center portion of lower longitudinal members of a frame in UAV 1100. In position A, also referred to as the first position, and in position D, also referred to as the third position, rotatable cargo bay 1130 has been upwardly rotated (position A) or downwardly rotated (position D) and extends within a cutout in wing 1120 and in wing spar 1122.

Figure 17A:
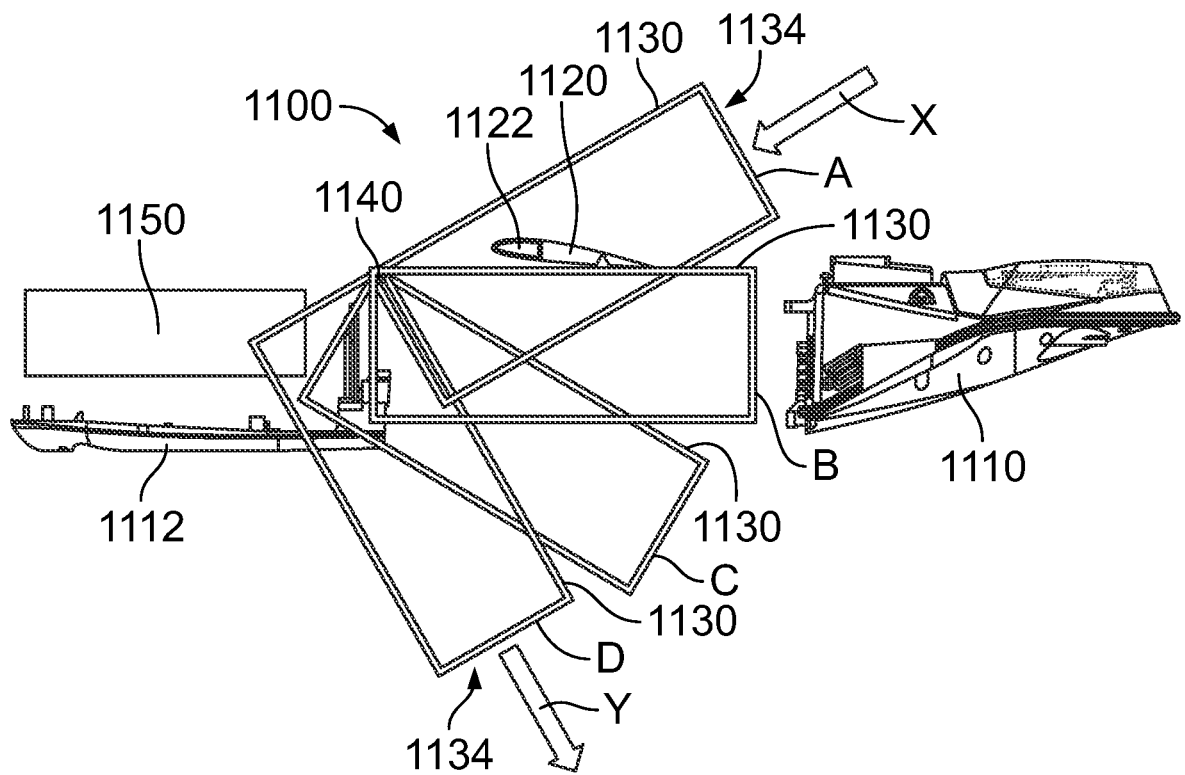
FIG. 17A is a side view of UAV 1100 shown with rotatable cargo bay 1130 rotating through positions A-D with lateral pivot axis 1140 positioned at an upper left intersection between longitudinal and vertical members of a frame in UAV 1100.
Figure 17B:
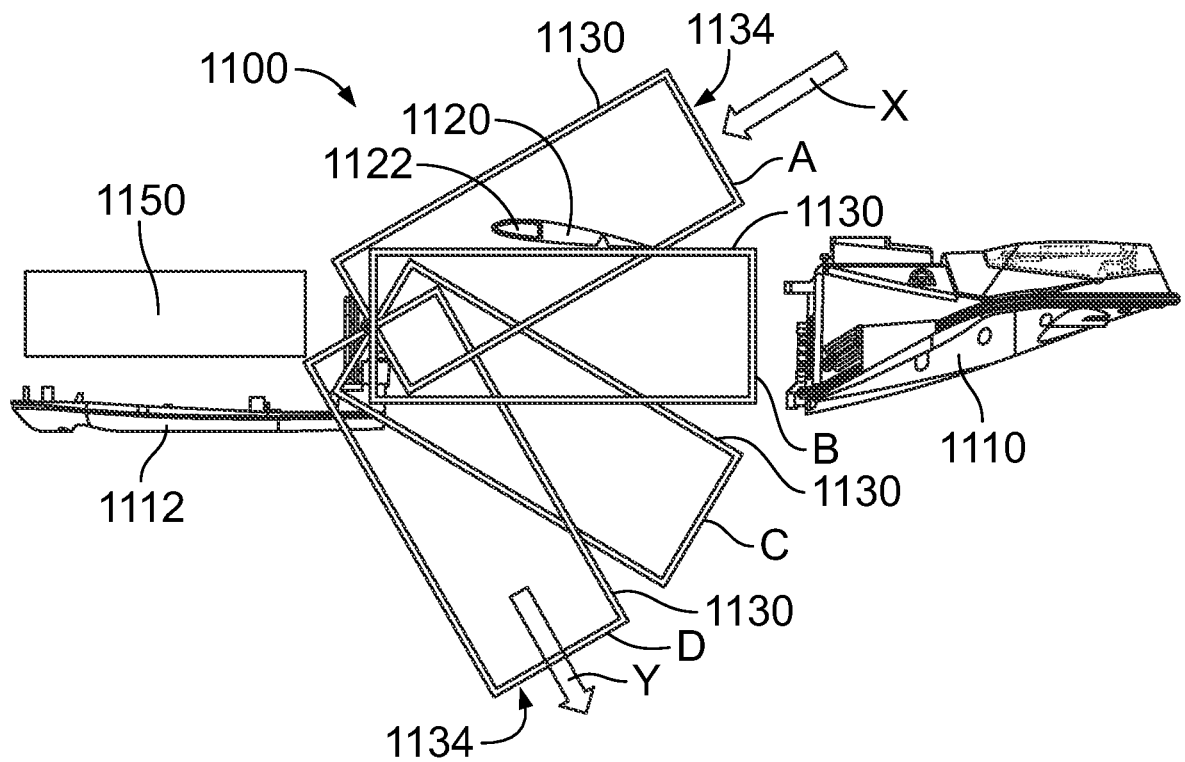
FIG. 17B is a side view of UAV 1100 shown with rotatable cargo bay 1130 rotating through positions A-D with lateral pivot axis 1140 positioned on a center portion of vertical members of a frame in UAV 1100.
Figure 17C:
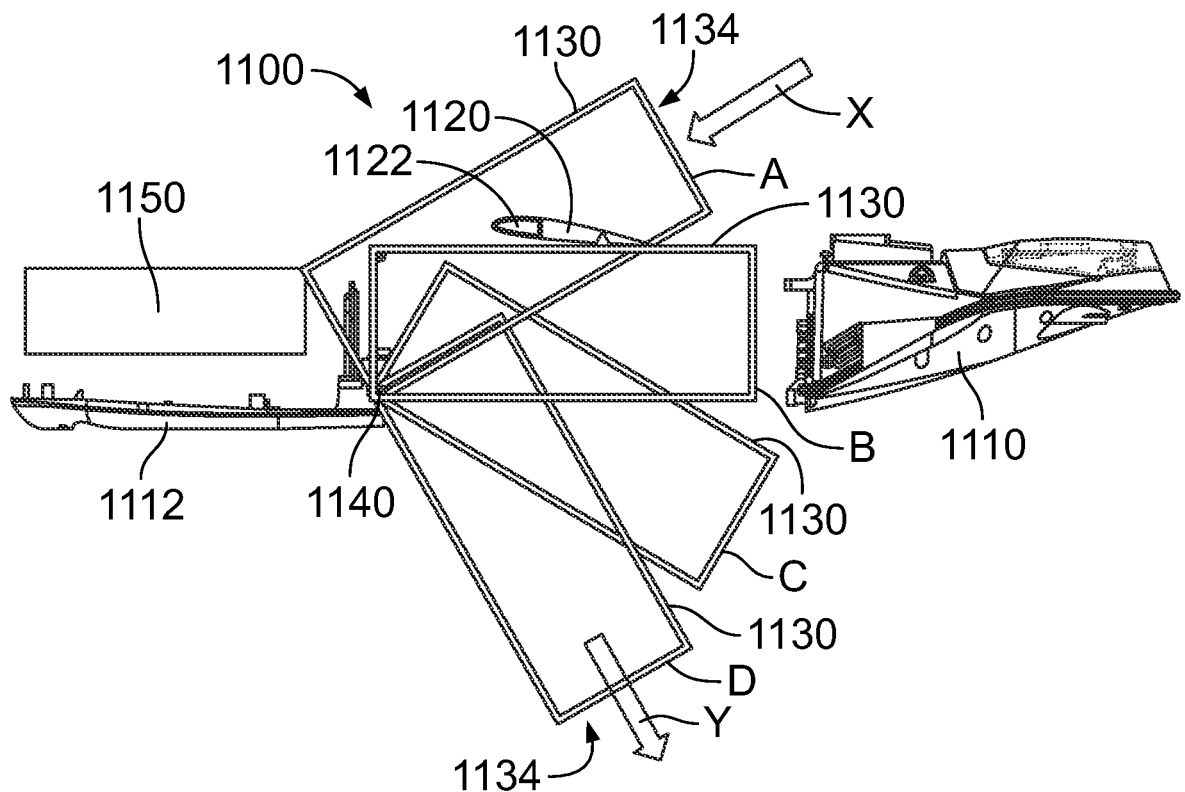
FIG. 17C is a side view of UAV 1100 shown with rotatable cargo bay 1130 rotating through positions A-D with lateral pivot axis 1140 positioned at a lower left intersection between longitudinal and vertical members of a frame in UAV 1100.

FIG. 17A is a side view of UAV 1100 shown with rotatable cargo bay 1130 with lateral pivot axis 1140 positioned at an upper left intersection between upper longitudinal members and forward vertical members of a frame in UAV 1100. FIG. 17B is a side view of UAV 1100 shown with rotatable cargo bay 1130 with lateral pivot axis 1140 positioned on a center portion of forward vertical members of a frame in UAV 1100. FIG. 17C is a side view of UAV 1100 shown with rotatable cargo bay 1130 with lateral pivot axis 1140 positioned at a lower left intersection between lower longitudinal members and forward vertical members of a cargo bay frame in UAV 1100. In FIGS. 17A-17C, In position A, also referred to as the first position, rotatable cargo bay 1130 has been upwardly rotated and extends within a cutout in wing 1120 and in wing spar 1122.

Figure 18A:
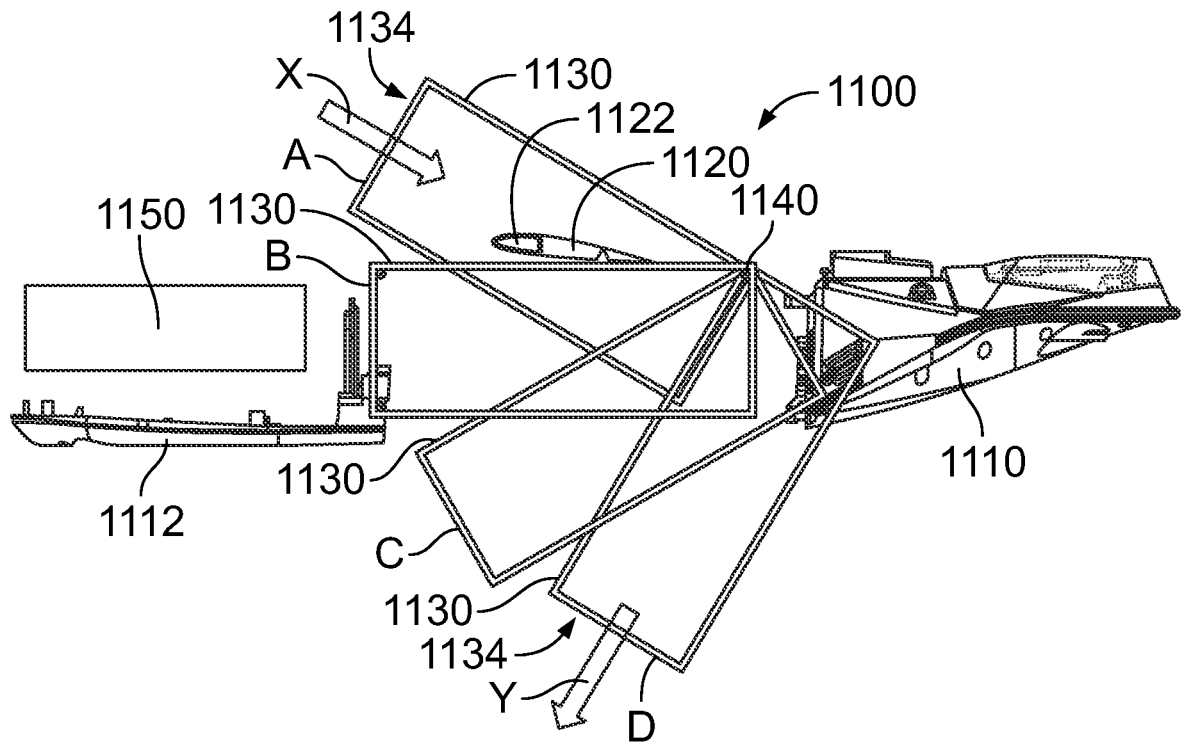
FIG. 18A is a side view of UAV 1100 shown with rotatable cargo bay 1130 rotating through positions A-D with lateral pivot axis 1140 positioned at an upper right intersection between longitudinal and vertical members of a frame in UAV 1100.
Figure 18B:
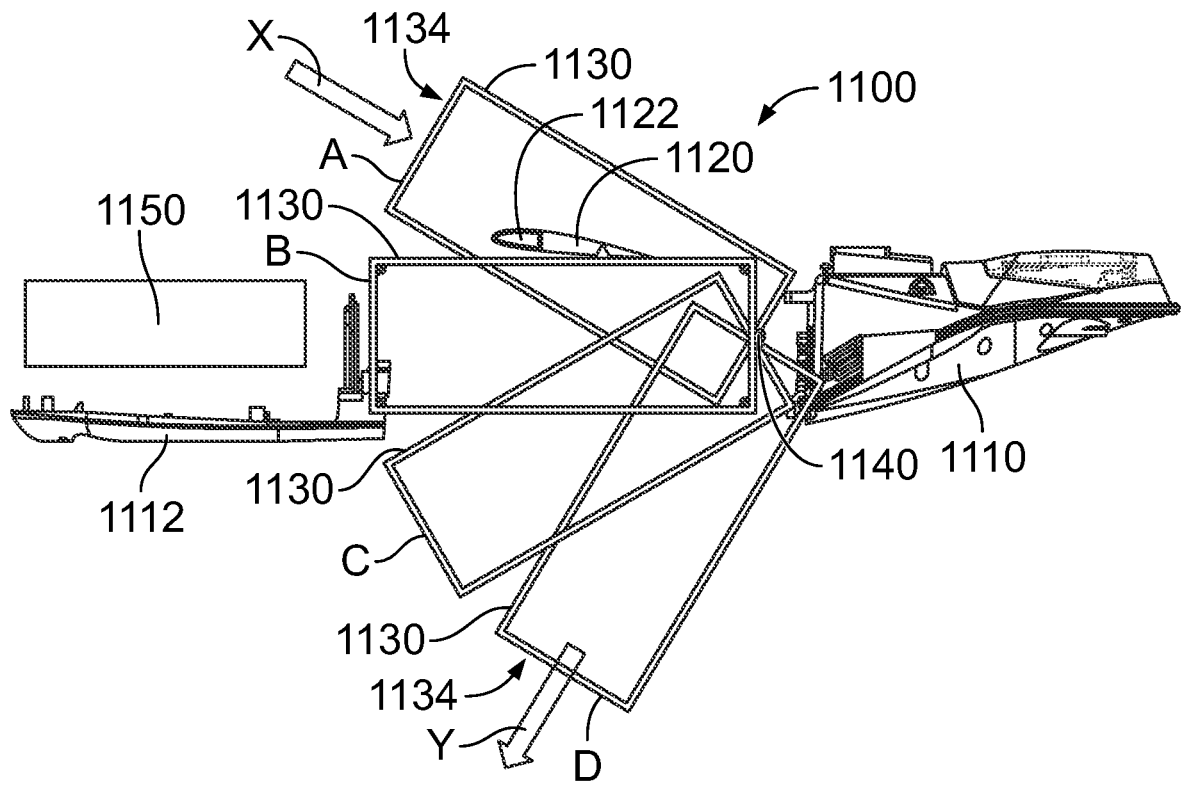
FIG. 18B is a side view of UAV 1100 shown with rotatable cargo bay 1130 rotating through positions A-D with lateral pivot axis 1140 positioned on a center portion of vertical members of a frame in UAV 1100.
Figure 18C:
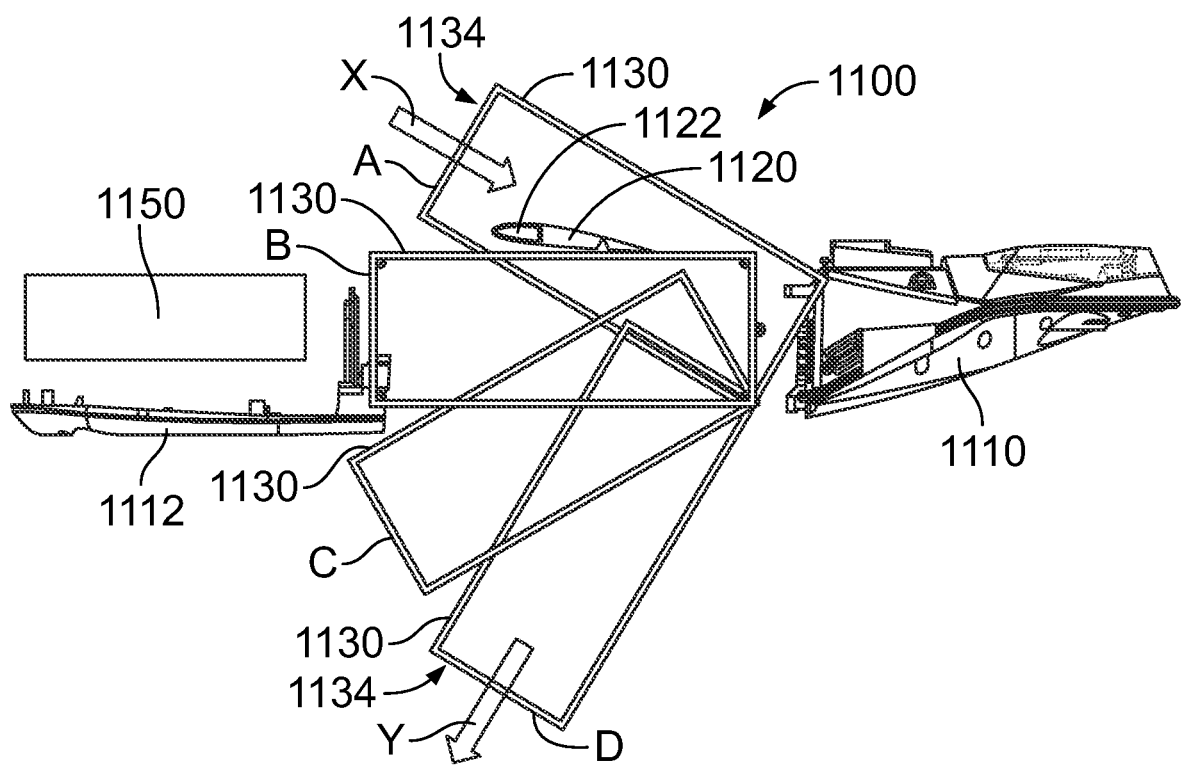
FIG. 18C is a side view of UAV 1100 shown with rotatable cargo bay 1130 rotating through positions A-D with lateral pivot axis 1140 positioned at a lower right intersection between longitudinal and vertical members of a frame in UAV 1100.

FIG. 18A is a side view of UAV 1100 shown with rotatable cargo bay 1130 with lateral pivot axis 1140 positioned at an upper right intersection between upper longitudinal members and rear vertical members of a frame in UAV 1100. FIG. 18B is a side view of UAV 1100 shown with rotatable cargo bay 1130 with lateral pivot axis 1140 positioned on a center portion of rear vertical members of a frame in UAV 1100. FIG. 18C is a side view of UAV 1100 shown with rotatable cargo bay 1130 with lateral pivot axis 1140 positioned at a lower right intersection between lower longitudinal members and rear vertical members of a frame in UAV 1100.

As illustrated in FIGS. 16A-16B, 17A-17C, and 18A-18C, in position A, rotatable cargo bay 1130 has been upwardly rotated about pivot axis 1140 such that the entrance 1134 is positioned above the fuselage body 1110, 1112 of UAV 1100. In position A, also referred to as the first position, a payload can be loaded into rotatable cargo bay 1130 through entrance 1134 in the direction of arrow X. After a payload has been positioned in rotatable cargo bay 1130, rotatable cargo bay 1130 is rotated downwardly into position B, also referred to as the second position, where rotatable cargo bay 1130 is positioned within the fuselage body 1110, 1112 of UAV 1100 for forward flight to a delivery site.

At the delivery site, the rotatable cargo bay 1130 is rotated downwardly about pivot axis 1140 to position C, and then further downwardly rotated about pivot axis 1140 to position D, also referred to as the third position, where the entrance 1134 is positioned beneath the fuselage body 1110, 1112 of UAV 1100 where the payload may exit rotatable cargo bay 1130 by passing through entrance 1134 in the direction of arrow Y and dropped at the delivery site. In the Figures above, the rotatable cargo bays are shown without using a winch, tether, and payload retriever described above. However, in some embodiments a winch, tether, and payload retriever could be used to lower a payload through the rotatable cargo bay to a delivery site.

In FIGS. 14A-18C, actuator 1160 may be positioned in a number of locations within UAV 1100 and is operable to provide rotational movement to rotatable cargo bay 1130 about pivot axis 1140. Actuator 1160 may be a servo motor. However, actuator 1160 may be any mechanism that can impart rotational movement to the rotatable cargo bay 1130, in or without conjunction with a linkage assembly, such as a rotary or linear actuator, a rotating gear, a rack and pinion mechanism, a hydraulic or pneumatic cylinder, and a rotary motor, as examples.

In FIGS. 15A-15F, 17A-17C, 18A-18C, when the rotatable cargo bay 1130 is rotated upwardly to the first position for reception of a payload, the location of the pivot axis 1140 is such that the rotatable cargo bay 1130 advantageously does not extend below the fuselage body 1110, 1112 of UAV 1100 so that no ground clearance for the UAV 1100 is needed when a payload is placed through the entrance 1134 of rotatable cargo bay 1130.

It should be noted that in FIGS. 13A-18C described above, the pivot axis 1140 is shown as a lateral pivot axis in UAV 1100, which is preferred. A lateral pivot axis is a pivot axis that extends transversely in the fuselage body 1110, 1112 perpendicular to an axis extending from a front to a rear of the fuselage body 1110, 1112 of UAV 1100. However, pivot axis 1140 could also be positioned longitudinally or at an angle on UAV 1100. A longitudinal pivot axis is a pivot axis that extends from a front to a rear of the fuselage body 1110, 1112 of UAV 1100.

Figure 19A:
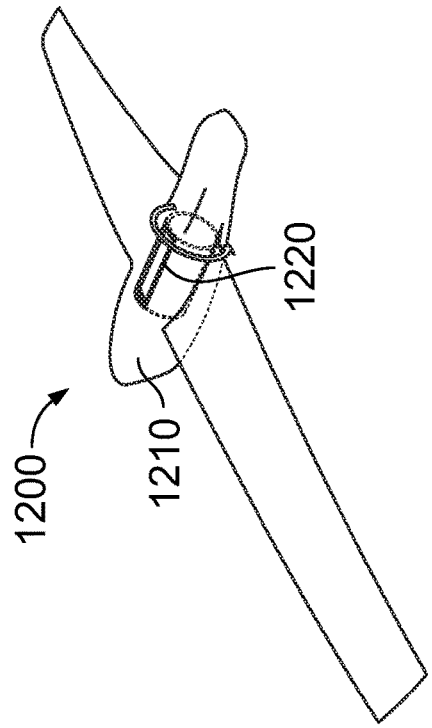
FIG. 19A is a perspective top view of UAV 1200 having rotatable cargo bay 1220 illustrating payload 1250 being loaded into cargo bay 1220.
Figure 19B:
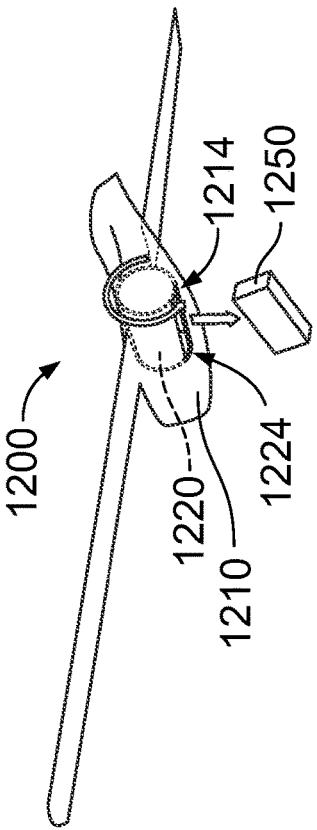
FIG. 19B is another perspective top view of UAV 1200 illustrating rotatable cargo bay 1220 being prior to rotation into position for forward flight.
Figure 19C:
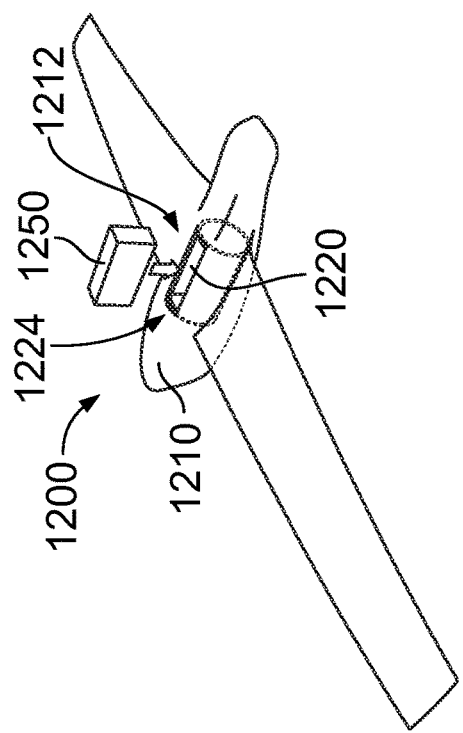
FIG. 19C is a perspective top view of UAV 1200 with rotatable cargo bay 1220 positioned for forward flight.
Figure 19D:
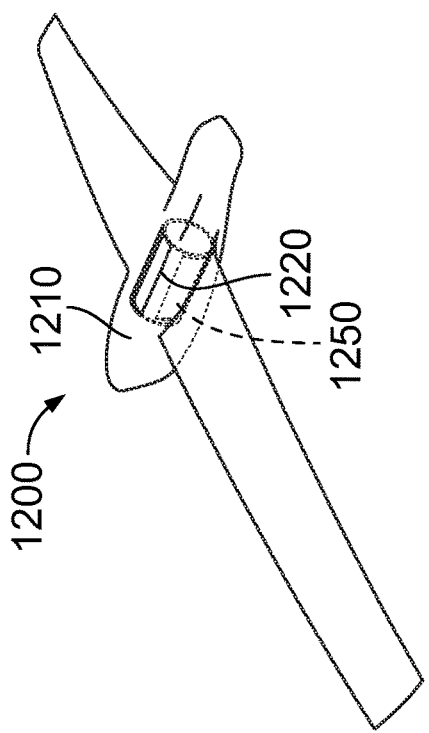
FIG. 19D is a perspective top view of UAV 1200 with rotatable cargo bay 1220 rotated into position to drop payload 1250 at a delivery site.
Figure 20A:
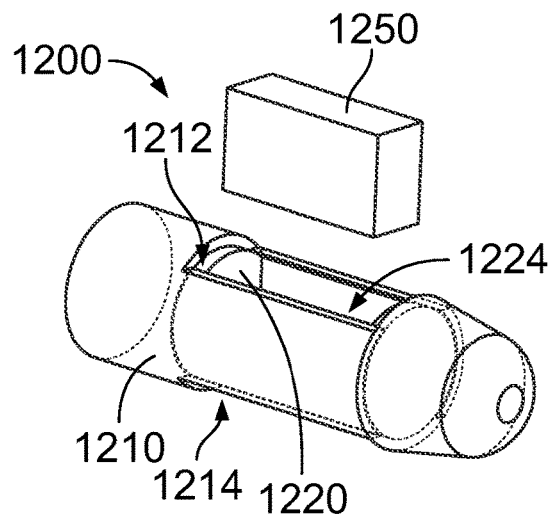
FIG. 20A is a perspective side view of a portion of UAV 1200 with rotatable cargo bay 1220 shown in a first position ready for placement of payload 1250 into rotatable cargo bay 1220.
Figure 20B:
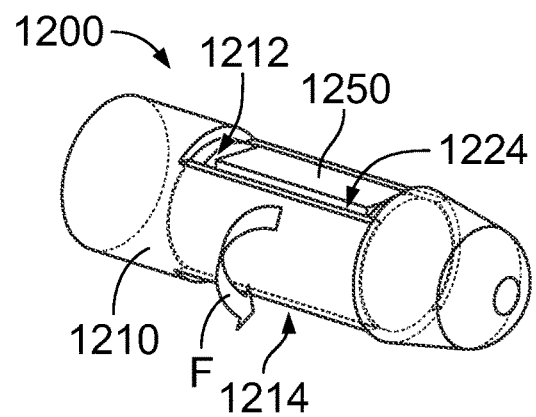
FIG. 20B is a perspective side view of a portion of UAV 1200 with rotatable cargo bay 1220 shown in a first position with payload 1250 positioned in rotatable cargo bay 1220.
Figure 20C:
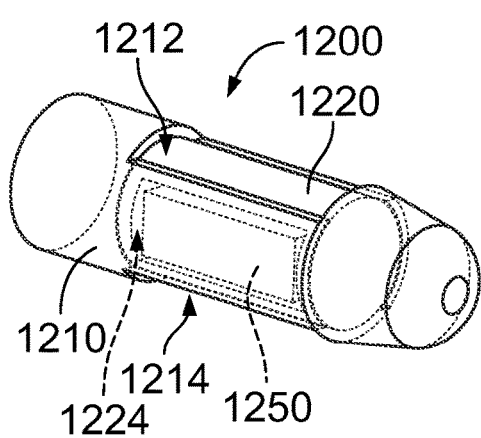
FIG. 20C is a perspective side view of a portion of UAV 1200 with rotatable cargo bay 1220 shown in a second position within fuselage body 1210 of UAV 1200.

FIGS. 19A and 20A are perspective top views of UAV 1200 having rotatable cargo bay 1220 illustrating payload 1250 being loaded into cargo bay 1220; FIGS. 19B and 20B are perspective top views of UAV 1200 illustrating rotatable cargo bay 1220 with payload 1250 positioned in rotatable cargo bay 1220 prior to rotation into position for forward flight; FIGS. 19C and 20C are perspective top views of UAV 1200 after rotation of rotatable cargo bay 1220 into position for forward flight; and FIGS. 19D and 20D are perspective top views of UAV 1200 with rotatable cargo bay 1220 rotated into position to drop payload 1250 at a delivery site.

In FIGS. 19A and 20A, rotatable cargo bay 1220 is shown in a first position with an entrance 1224 of rotatable cargo bay 1220 aligned with a first opening 1212 in an upper surface of the fuselage body 1210 of UAV 1200. In the first position shown in FIGS. 19A and 20A, payload 1250 is placed into rotatable cargo bay 1220 through the first opening 1212 in the upper surface body 1210 and through entrance 1224 of rotatable cargo bay 1220. In FIGS. 19B and 20B, payload 1250 is positioned in rotatable cargo bay 1220 which is shown prior to rotation into a second position for forward flight. In FIG. 19C, rotatable cargo bay 1220 has been rotated into a second position where payload 1250 is positioned in rotatable cargo bay 1220 and rotatable cargo bay obstructs entrance 1212 in the upper surface of fuselage body 1210 during forward flight. In FIGS. 19C and 20C, rotatable cargo bay 1220 is shown having a solid structure around entrance 1224. However, rotatable cargo bay 1220 could be non-solid, e.g. having slats with openings between the slats, such that when rotatable cargo bay 1220 is in the second position, the first opening 1212 in the upper surface of fuselage body 1210 will only partially obstruct entrance 1212 in fuselage body 1210 of UAV 1200.

Figure 20D:
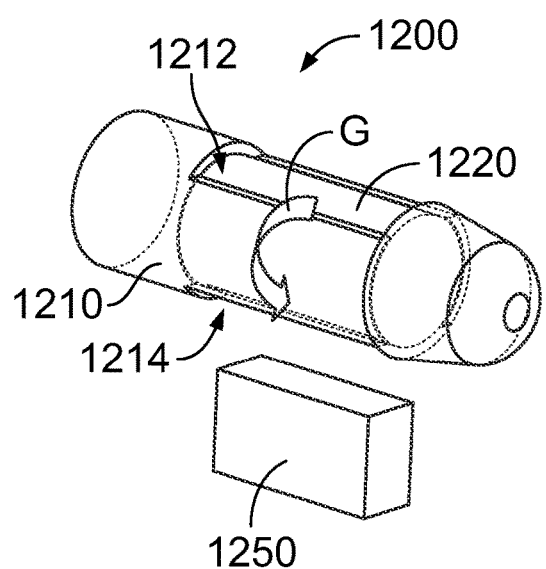
FIG. 20D is a perspective side view of a portion of UAV 1200 with rotatable cargo bay 1220 shown in a third position and dropping payload 1250 from rotatable cargo bay 1220.

FIGS. 19D and 20D illustrate UAV 1200 at a delivery site where rotatable cargo bay 1220 has been rotated into a third position where the entrance 1224 to rotatable cargo bay 1220 is aligned with a second opening 1214 in a lower surface of fuselage body 1210 of UAV 1200. At the delivery site, when the rotatable cargo bay 1220 is in the third position as shown in FIGS. 19D and 20D, payload 1250 is allowed to exit rotatable cargo bay 1220 through entrance 1224 of rotatable cargo bay 1220 and second opening 1214 in the lower surface of fuselage body 1210 of UAV 1200 where it dropped from UAV 1200 at the delivery site.

An actuator may be positioned in a number of locations within the fuselage body 1210 of UAV 1200 and is operable to cause rotational movement of rotatable cargo bay 1220 about a pivot axis. The actuator may be a servo motor. However, the actuator may be any mechanism that can impart rotational movement to the rotatable cargo bay 1220, in or without conjunction with a linkage assembly, such as a rotary or linear actuator, a rotating gear, a rack and pinion mechanism, a hydraulic or pneumatic cylinder, and a rotary motor, as examples.

It should be noted that in FIGS. 19A-19D and 20A-20D described above, the pivot axis is shown as a longitudinal pivot axis in UAV 1200, which is preferred. However, the pivot axis could also be positioned laterally or at an angle on UAV 1200.

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. An unmanned aerial vehicle (UAV) comprising:
   a wing attached to a fuselage body;
   a rotatable cargo bay positioned in the fuselage body for transporting a payload, the rotatable cargo bay having an entrance for receiving the payload;
   an actuator positioned in the fuselage body operable to rotate the rotatable cargo bay about a pivot axis;
   wherein the rotatable cargo bay is upwardly rotatable into a first position where the entrance of the rotatable cargo bay is positioned above the fuselage body to allow for entry of the payload into the rotatable cargo bay and where the rotatable cargo bay extends through an opening in an upper surface of the fuselage body;
   wherein the rotatable cargo bay is rotatable into a second position where the entrance of the rotatable cargo bay is positioned within the fuselage body during transport of the payload; and
   wherein the rotatable cargo bay is rotatable into a third position where the entrance of the rotatable cargo bay is positioned below the fuselage body to allow for exiting of the payload from the rotatable cargo bay and where the rotatable cargo bay extends through an opening in a lower surface of the fuselage body.

2. The UAV of claim 1, wherein the pivot axis is located on an underside of a wing spar on the wing.

3. The UAV of claim 2, wherein the wing spar extends over the rotatable cargo bay.

4. The UAV of claim 3, wherein when the rotatable cargo bay is in the first position, the rotatable cargo bay is positioned in a cutout in the wing located behind the wing spar.

5. The UAV of claim 1, wherein the actuator is a servo motor.

6. The UAV of claim 1, wherein the actuator is mounted to the rotatable cargo bay.

7. The UAV of claim 1, wherein the actuator is mounted to the fuselage body, wherein a linkage assembly is attached to the actuator and is attached to the rotatable cargo bay, and wherein the actuator and linkage assembly are operable to provide rotation of the rotatable cargo bay.

8. The UAV of claim 7, wherein the linkage assembly includes a retractable string.

9. The UAV of claim 1, wherein the pivot axis is a lateral pivot axis.

10. The UAV of claim 1, wherein a cargo bay frame is positioned within the fuselage body, and the rotatable cargo bay is positioned within, and rotatably mounted to, the cargo bay frame.

11. The UAV of claim 10, wherein the pivot axis is adjacent to a pair of longitudinally extending frame members on a cargo bay frame positioned within the fuselage body, and when the rotatable cargo bay is in the first position, the rotatable cargo bay extends between a first side of a wing spar on the wing and a second side of the wing spar.

12. The UAV of claim 10, wherein the pivot axis is adjacent to a pair of upwardly extending frame members on a cargo bay frame positioned within the fuselage body, and when the rotatable cargo bay is in the first position, the rotatable cargo bay extends between a first side of wing spar on the wing and a second side of the wing spar.

13. The UAV of claim 10, wherein the pivot axis is adjacent to an intersection between a pair of longitudinally extending frame members on a cargo bay frame positioned within the fuselage body and a pair of upwardly extending frame members on the cargo bay frame, and when the rotatable cargo bay is in the first position, the rotatable cargo bay extends between a first side of a wing spar on the wing and a second side of the wing spar.

14. An unmanned aerial vehicle (UAV) comprising:
    a fuselage body;
    a rotatable cargo bay positioned in the fuselage body for transporting a payload, the rotatable cargo bay having an entrance for receiving the payload;
    an actuator positioned in the fuselage body operable to rotate the rotatable cargo bay about a pivot axis;
    wherein the rotatable cargo bay is rotatable into a first position where the entrance of the rotatable cargo bay is accessible through a first opening in an upper portion of the fuselage body and provides for the positioning of the payload into the rotatable cargo bay;
    wherein the rotatable cargo bay is rotatable into a second position where the entrance of the rotatable cargo bay is positioned within, and covered by, at least a portion of the fuselage body during transport of the payload; and
    wherein the rotatable cargo bay is rotatable into a third position, where the entrance of the rotatable cargo bay is accessible through a second opening in a lower portion of the fuselage body to allow for exiting of the payload from the rotatable cargo bay.

15. The UAV of claim 14, wherein the pivot axis is a longitudinally extending axis.

16. The UAV of claim 14, wherein the actuator is a servo motor.

17. The UAV of claim 14, wherein the actuator is mounted to the rotatable cargo bay.

18. A method comprising:
    providing an unmanned aerial vehicle (UAV) including a wing attached to a fuselage body, a rotatable cargo bay positioned in the fuselage body for transporting a payload, the rotatable cargo bay having an entrance for receiving the payload, an actuator positioned in the fuselage body operable to rotate the rotatable cargo bay about a pivot axis, wherein the rotatable cargo bay is upwardly rotatable into a first position where the entrance of the cargo bay is positioned above the fuselage body to allow for entry of the payload into the rotatable cargo bay, and the rotatable cargo bay extends through an opening in an upper surface of the fuselage body, wherein the rotatable cargo bay is rotatable into a second position where the entrance of the rotatable cargo bay is positioned within the fuselage body during transport of the payload, and wherein the rotatable cargo bay is rotatable into a third position where the entrance of the rotatable cargo bay is positioned below the fuselage body to allow for exiting of the payload from the rotatable cargo bay, and the rotatable cargo bay extends through an opening in a lower surface of the fuselage body;

rotating the rotatable cargo bay into the first position;
receiving the payload in the rotatable cargo bay;
rotating the rotatable cargo bay into the second position for transport;
rotating the rotatable cargo bay into the third position, and
dropping the payload from the rotatable cargo bay.

19. A method comprising:

providing an unmanned aerial vehicle (UAV) including a fuselage body; a rotatable cargo bay positioned in the fuselage body for transporting a payload, the rotatable cargo bay having an entrance for receiving the payload; an actuator positioned in the fuselage body operable to rotate the rotatable cargo bay about a pivot axis; wherein the rotatable cargo bay is rotatable into a first position where the entrance of the rotatable cargo bay is accessible through a first opening in an upper portion of the fuselage body and provides for the positioning of the payload into the rotatable cargo bay; wherein the rotatable cargo bay is rotatable into a second position where the entrance of the rotatable cargo bay is positioned within, and covered by, at least a portion of the fuselage body during transport of the payload; and wherein the rotatable cargo bay is rotatable into a third position, where the entrance of the rotatable cargo bay is accessible through a second opening in a lower portion of the fuselage body to allow for exiting of the payload from the rotatable cargo bay;

rotating the rotatable cargo bay into the first position;
receiving the payload in the rotatable cargo bay;
rotating the rotatable cargo bay into the second position for transport;
rotating the rotatable cargo bay into the third position, and
dropping the payload from the rotatable cargo bay.

20. The method of claim 19, wherein the pivot axis is a longitudinally extending axis.

* * * * *